(12) United States Patent
Hori et al.

(10) Patent No.: US 7,004,270 B2
(45) Date of Patent: Feb. 28, 2006

(54) SUSPENSION APPARATUS OF MULTI-AXLE VEHICLE

(75) Inventors: Kazutoshi Hori, Komatsu (JP); Yasunari Suzuki, Komatsu (JP); Takeo Ueda, Komatsu (JP); Toshiyuki Hirata, Komatsu (JP)

(73) Assignee: Komatsu Ltd., Tokyo (JP)

( * ) Notice: Subject to any disclaimer, the term of this patent is extended or adjusted under 35 U.S.C. 154(b) by 92 days.

(21) Appl. No.: 10/699,278

(22) Filed: Oct. 30, 2003

(65) Prior Publication Data

US 2004/0090034 A1 May 13, 2004

(30) Foreign Application Priority Data

Nov. 12, 2002 (JP) ...................................... 2002-328880

(51) Int. Cl.
*B60G 5/04* (2006.01)

(52) U.S. Cl. ............ 180/9.52; 180/24.01; 280/124.128; 280/124.129

(58) Field of Classification Search ................. 180/9.5, 180/9.52, 9.54, 24.01, 24.05, 24.11, 24.13; 280/682, 676, 124.116, 124.129, 124.128, 280/124.153

See application file for complete search history.

(56) References Cited

U.S. PATENT DOCUMENTS

| 994,317 | A | | 6/1911 | Holt | |
|---|---|---|---|---|---|
| 1,579,245 | A | | 4/1926 | Pennington | |
| 1,806,819 | A | | 5/1931 | Paulsen | |
| 3,295,623 | A | | 1/1967 | Kyzer | |
| 3,420,958 | A | | 2/1969 | Ross | |
| 3,429,585 | A | | 2/1969 | Ross | |
| 3,539,197 | A | | 11/1970 | Remaud | |
| 3,740,069 | A | * | 6/1973 | Fister et al. | ............. 280/679 |
| 4,256,327 | A | * | 3/1981 | Leinweber | ............. 280/684 |
| 4,379,571 | A | | 4/1983 | Simmons | |
| 4,397,473 | A | | 8/1983 | Miles et al. | |
| 4,577,711 | A | * | 3/1986 | Butler | ............. 180/24.1 |
| 4,756,550 | A | * | 7/1988 | Raidel | ............. 280/86.75 |
| 4,923,257 | A | | 5/1990 | Purcell | |
| 5,273,126 | A | | 12/1993 | Reed et al. | |
| 5,452,949 | A | | 9/1995 | Kelderman | |
| 5,575,347 | A | | 11/1996 | Uchibaba et al. | |
| 5,944,339 | A | | 8/1999 | McKenzie et al. | |
| 6,334,496 | B1 | | 1/2002 | Hiraki et al. | |

FOREIGN PATENT DOCUMENTS

| CH | 676449 A5 | | 1/1991 |
|---|---|---|---|
| DE | 41 08 333 A1 | | 9/1992 |
| FR | 2 700 501 A1 | | 7/1994 |
| GB | 2254056 | * | 9/1992 |
| JP | 2-283536 A | | 11/1990 |
| JP | 3-253414 | * | 11/1991 |
| JP | 4-8682 A | | 1/1992 |
| JP | 2000-62424 | * | 2/2000 |
| JP | 3049511 B2 | | 3/2000 |
| WO | WO 92/16387 A1 | | 10/1992 |

* cited by examiner

*Primary Examiner*—Avraham Lerner
(74) *Attorney, Agent, or Firm*—Frishauf, Holtz, Goodman & Chick, P.C.

(57) ABSTRACT

A suspension apparatus of a multi-axle vehicle capable of realizing high traveling stability is provided. For this purpose, the suspension apparatus forms a quadric link structure (31) by a vehicle body (9), a front link (21) with an upper end portion being connected to the vehicle body with a pin and a lower end portion being in a vicinity of a front axle, a rear link (22) with an upper end portion being connected to the vehicle body with a pin and a lower end portion located in a vicinity of a rear axle, and a connecting link (1) for connecting portions in vicinities of respective lower end portions of the front and rear links, and a side length at a side of the connecting link is made shorter than a side length at a vehicle body side.

48 Claims, 16 Drawing Sheets

F I G. 1
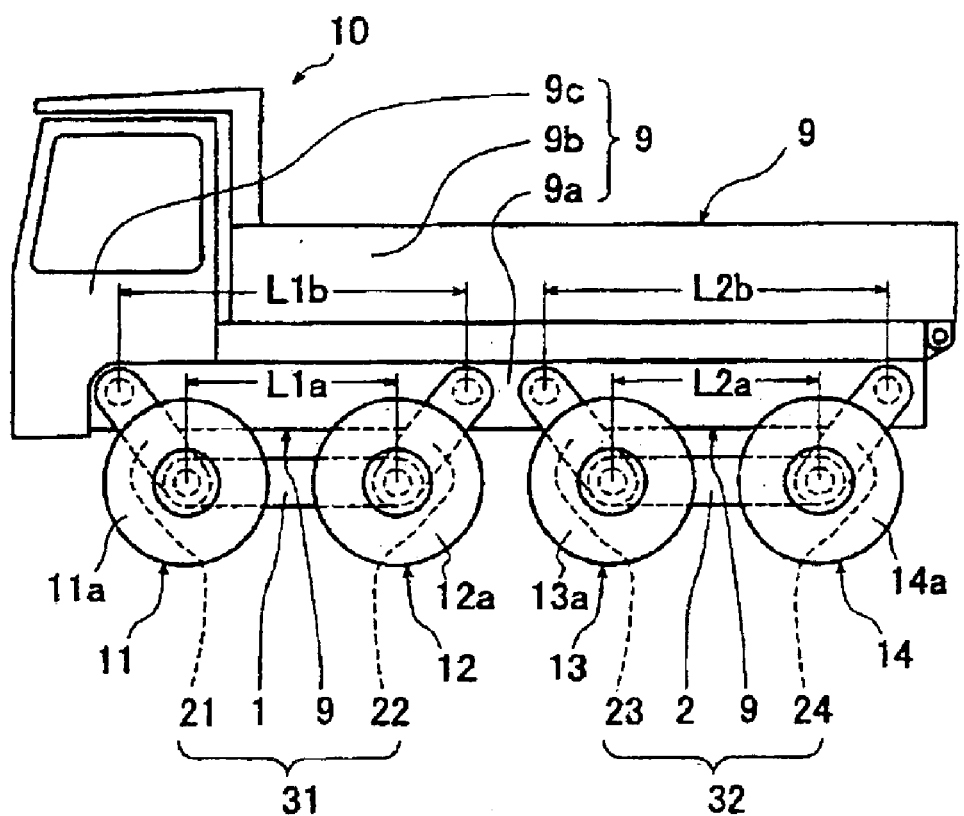

SUSPENSION APPARATUS OF MULTI-AXLE VEHICLE

TECHNICAL FIELD

The present invention relates to a suspension apparatus of a multi-axle vehicle.

BACKGROUND ART

As is generally known, in a multi-axle vehicle having three or more tire axles (six tired wheels), it is possible to reduce pressure of ground contact of each tired wheel because the mass of the vehicle can be distributed to the multiple axles, whereby it can be frequently used as a tire type carrier vehicle capable of traveling even on, for example, a soft ground. In this case, a suspension apparatus of a multi-axle vehicle is generally made an independent suspension for each tired wheel for the purpose of equalizing pressure of ground contact of each tired wheel even on the ground with bumps and dips, thereby making it possible to travel on an uneven ground and also making it possible to travel the whole distance on a soft ground without damaging the ground.

In order to simplify the explanation, a tire axle is used for collectively calling a pair of left and right tired wheels and an axle for supporting the left and right tired wheels. Further, an axle is not limited to an integrated type of axle (rigid axle) for connecting the left and right tired wheels, but includes each of left and right independent suspension type of axles for independently supporting left and right tired wheels.

A structure for responding to a ground surface with bumps and dips is also considered in a track-laying vehicle other than a multi-axle vehicle. For example, Japanese Patent No. 3049511 (especially on page 4 and FIG. 1) describes a structure in which a pair of left and right triangular crawler devices are placed at each of a front part and a rear part of a vehicle, but prior art limited to suspension apparatuses of multi-axle vehicles will be explained below. Based on FIG. 15, an example of a suspension apparatus of a multi-axle vehicle according to a prior art will be explained with a tire type carrier vehicle having four tire axles cited as an example. In a carrier vehicle 90, four tire axles 91, 92, 93 and 94 are mounted to a vehicle body 95 constituted of a frame 95a, a rear deck 95b, a driver's cab 95c and the like via suspension apparatuses 91b, 92b, 93b and 94b, respectively. The tire axles 91, 92, 93 and 94 have tired wheels 91a, 92a, 93a and 94a, respectively. Since a right side of the vehicle body is the same as the above description, the explanation thereof will be omitted, and only a left side of the vehicle body will be explained hereinafter.

In the above-described constitution, the mass of the vehicle body 95 is distributed to the four tire axles 91, 92, 93 and 94, and therefore pressure of ground contact of the tired wheels 91a, 92a, 93a and 94a is low. Further, the tire axles 91, 92, 93 and 94 individually have the suspension apparatuses 91b, 92b, 93b and 94b, respectively, and therefore the mass of the vehicle body 95 is also distributed to each of the tire axles 91, 92, 93 and 94 on a ground having bumps and dips. As a result of these, it is made possible for the carrier vehicle 90 to travel on an uneven ground and travel the whole distance on a soft ground without damaging the ground.

However, in the suspension apparatuses 91b, 92b, 93b and 94b, there are several problems occurring due to the multi-axles and independent suspensions. A first problem will be explained initially based on FIG. 16A and FIG. 16B. In FIG. 16A, a phenomenon, in which a front part of the vehicle body 95 is lifted in a direction of the arrow U (hereinafter, called squat), is caused by moment by an inertia force of a mass G of the vehicle 95 and its road clearance H1, when the carrier vehicle 90 starts, as is generally known. For the same reason, a phenomenon, in which the front part of the vehicle body 95 sinks in a direction of the arrow N (hereinafter, called nose down), is caused when the carrier vehicle 90 stops. On that occasion, the squat is suppressed by a supporting force of the rearmost suspension apparatus 94b, and the nose down is suppressed by a supporting force of the suspension apparatus 91b at the forefront.

Since the carrier vehicle 90 has the four tire axles, the mass of the vehicle body 95 is made small by being distributed by being divided into substantially four equal parts of respective axle loads P1, P2, P3 and P4 of the four tire axles 91, 92, 93 and 94, and the supporting force of each of the suspension apparatuses 91b, 92b, 93b and 94b is made small corresponding to this. As a result of them, the squat and nose down of the carrier vehicle 90 tend to be larger than those of the other ordinary two-axle vehicles.

In FIG. 16B, the vehicle body 95, which is long in a longitudinal direction, has a large inertia moment Ip within a vertical surface in the longitudinal direction, and therefore it cannot fully follow the movement of each of the tire axles 91, 92, 93 and 94 when the carrier vehicle 90 travels on an uneven ground, thus causing swing shown by the arrow P (hereinafter, called pitching). Meanwhile, the supporting force of each of the suspension apparatus 91b at the forefront and the suspension apparatus 94b at the rear end to suppress the pitching is set to be small. Further, in the raised ground as shown in the drawing, a phenomenon, in which the suspension apparatuses 91b at the forefront and 94b at the rear end are in the extended state, as a result that the tire axles 92 and 93 are propped up at center portions, and the supporting forces become smaller. As a result of them, the carrier vehicle 90 cannot fully suppress pitching in travel on an uneven ground in some cases, and there arises the problem that the pitching has to be converged by making the traveling speed extremely low in such a case.

A second problem will be explained based on FIG. 17. In FIG. 17, limit height S of a step, which the carrier vehicle 90 can get over, is generally D/2 that is a half of a diameter D of the tired wheel 91a at the forefront. Consequently, in order to enhance mobility on an uneven ground, it is necessary to increase the diameter D of the tired wheel 91a. On the other hand, in the carrier vehicle 90, four of the tire axles are placed for the purpose of enabling the carrier vehicle 90 to travel the while distance on a soft ground in an uneven ground, whereby the axle load per axle is made small. Consequently, there is not an enough space to increase the diameters D of the tired wheels 91a, 92a, 93a and 94a. As a result of them, there is the problem that the carrier vehicle 90 cannot get over a large step.

A third problem will be explained based on FIG. 18A to FIG. 18D. First, in FIG. 18A, when the carrier vehicle 90 gets over a step on a soft ground, the tired wheel 91a is pressed against a tip end S1 of the step with the force P1 and is lifted upward, and the load distribution to the tired wheel 91 becomes large. In FIG. 18B, the axel load of the tire axle 91 is large, and therefore the tired wheel 91a sinks to form a track T1. The tire axle 92 is pressed against a tip end S2 of the step with the force of P2 and lifted upward, and the load distribution to the tire axle 92 becomes large.

In FIG. 18C, the axle load of the tire axle 92 is large, and therefore the tired wheel 92a sinks to deepen the track to T2.

The tire axle 93 is pressed against a tip end S3 of the step with the force of P3 and lifted upward, and the load distribution to the tire axle 93 becomes large. In FIG. 18D, the axle load of the tire axle 93 is large, and therefore the tired wheel 93a sinks to deepen the track to T3. This results in the state in which the tip end S1 of the step at an intermediate portion of the left and right tracks contacts a center portion of the tire axle 93 or the tire axle 94 and the carrier vehicle cannot move (hereinafter, called a stack state). Namely, there is the problem that the phenomenon, in which every time each of the four tire axles 91, 92, 93 and 94 gets over the step in succession, the axle load concentrates on each of the axles, is repeated, whereby the deep track T3 is formed, and the carrier vehicle 90 is easily brought into the stack state.

SUMMARY OF THE INVENTION

The present invention is made in view of each of the above-described problems, and has its object to provide a suspension apparatus of a multi-axle vehicle which realizes traveling stability which hardly causes pitching, a performance of getting over a high step, and a performance of traveling the whole distance on a soft ground, in a suspension apparatus of a multi-axle vehicle having three or more of tire axles.

In order to attain the above-described object, a first constitution of a suspension apparatus of a multi-axle vehicle according to the present invention includes: in a suspension apparatus of a multi-axle vehicle having at least three tire axles; i) a front link of which upper end portion is connected to a vehicle body with a pin, and of which lower end portion is in a vicinity of a front axle, ii) a rear link of which upper end portion is connected to the vehicle body with a pin, and of which lower end portion is in a vicinity of a rear axle, and iii) a connecting link for longitudinally connecting portions in vicinities of the respective lower end portions of the front link and the rear link, which are placed in vicinities of at least a pair of the front axle and the rear axle, with an optional adjacent front axel and rear axle being paired; and at least one quadric link structure formed by the vehicle body, the front link, the rear link and the connecting link; and the front axle is mounted to a vicinity of a front joint at a lower side of at least the one quadric link structure and the rear axle is mounted to a vicinity of a rear joint at the lower side of at least the one quadric link structure; and in at least the one quadric link structure, a side length at a side of the connecting link is shorter than a side length at a side of the vehicle body.

According to the above first constitution, the following operations and effects can be obtained.

(1) The quadric link structure is in an inverse-trapezoid shape with the side length at the side of the connecting link being shorter than the side length at the side of the vehicle body. Consequently, the connecting link is in the attitude lower at the front when it swings forward and is in the attitude lower at the rear when it swings rearward, and the vertical positions of the front joint and rear joint at the lower side change. As a result of it, the vertical positions of the front axle and the rear axle, which are mounted respectively in the vicinities of the front joint and the rear joint at the lower side, change.

(2) As a result of the above-described (1), the paired front axle and rear axles of the tire axles autonomously determine their own positions with respect to the ground having bumps and dips so that both the front axle and the rear axle contact the ground. Thus, the paired front axle and rear axle of the tire axles can always follow the ground having bumps and dips.

(3) In the case of the above-described (2), the quadric link structure displaces the attitude so that the axle loads on the front axle and the rear axle of the paired tire axles are always substantially equal to each other. Accordingly, the axle loads on the front axle and the rear axle are always substantially equal to each other, irrespective of the shape of the ground, and the axle load does not concentrate on a specific axle, thus making it possible to obtain the high performance of traveling the whole distance on a soft ground.

(4) Since the vehicle body can be supported with one set of the front axle and the rear axle of the paired tire axles without vertical extension or contraction, pitching of the vehicle body can be suppressed.

A second constitution of the suspension apparatus of the multi-axle vehicle according to the present invention includes: in a suspension apparatus of a multi-axle vehicle having at least four tire axles; i) a front link of which upper end portion is connected to a vehicle body with a pin, and of which lower end portion is in a vicinity of a front axle, ii) a rear link of which upper end portion is connected to the vehicle body with a pin, and of which lower end portion is in a vicinity of a rear axle, and iii) a connecting link for longitudinally connecting portions in vicinities of the respective lower end portions of the front link and the rear link, which are placed in vicinities of at least a pair of the front axle and the rear axle including a pair at a forefront, with a first and a second axels from a front of the vehicle being made the pair at the forefront, and at least one pair being formed with an optional adjacent front axel and rear axle located at a rear side from a third axle from the front of the vehicle being paired; and at least one quadric link structure formed by the vehicle body, the front link, the rear link and the connecting link; and the front axle is mounted to a vicinity of a front joint at a lower side of at least the one quadric link structure and the rear axle is mounted to a vicinity of a rear joint at the lower side of at least the one quadric link structure; and in at least the one quadric link structure, a side length at a side of the connecting link is shorter than a side length at a side of the vehicle body.

According to the above second constitution, the following operations and effects can be obtained in addition to the operations and effects in the above-described first constitution.

(1) When the vehicle gets over a step, if the front axle of a pair of tire axles at the forefront is pressed against the step, the attitude of the quadric link structure is displaced, and the front axle moves upward and the rear axle moves downward. Thus, the front axle can ride on the step from a higher position with the rear axle being made the support point. As a result, the vehicle is capable of getting over the step with a height exceeding ½ of the tired wheel diameter.

(2) Since a set of the front axle and the rear axle of the pair of tire axles at the forefront can support the vehicle body without vertical extension and contraction, pitching of the vehicle body can be effectively suppressed.

A third constitution of the suspension apparatus of the multi-axle vehicle according to the present invention includes: in a suspension apparatus of a multi-axle vehicle having at least four tire axles; i) a front link of which upper end portion is connected to a vehicle body with a pin, and of which lower end portion is in a vicinity of a front axle, ii) a rear link of which upper end portion is connected to the vehicle body with a pin, and of which lower end portion is in a vicinity of a rear axle, and iii) a connecting link for longitudinally connecting portions in vicinities of the respective lower end portions of the front link and the rear link, which are placed in vicinities of at least a pair of the front axle and the rear axle including a pair at a rear end, with a second and a first axels from a rear of the vehicle being made the pair at the rear end, and at least one pair being formed with an optional adjacent front axel and rear axle at a front side including a third axle from the rear of the vehicle being paired; and at least one quadric link structure formed by the vehicle body, the front link, the rear link and the connecting link; and the front axle is mounted to a vicinity of a front joint at a lower side of at least the one quadric link structure and the rear axle is mounted to a vicinity of a rear joint at the lower side of at least the one quadric link structure; and in at least the one quadric link structure, a side length at a side of the connecting link is shorter than a side length at a side of the vehicle body.

According to the above third constitution, the following operations and effects can be obtained in addition to the operations and effects in the above-described first constitution. The explanation will be made with the vehicle having three tire axles, namely, the vehicle, in which the suspension apparatus according to the prior art is applied to the first tire axle from the front, and the suspension apparatus according to the present invention is applied to the second and the third tire axles, as an example.

(1) The rear part of the vehicle body is supported by a set of the front axle and the rear axle of a pair of tire axles without vertical extension and contraction, but the front part of the vehicle body is free in the vertical direction since the attitude of the quadric link structure is free, and the front part of the vehicle body is supported by the suspension apparatus of the first tire axle from the front to determine the attitude of the vehicle body. Thus, the riding quality of the driver's cab placed at the front part of the vehicle body can be given the same softness as with the suspension apparatus according to the prior art.

(2) Irrespective of the shape of the ground, the initially set distribution amount is always kept for the axle load of each of three tire axles, and the axle load does not concentrate on a specific axle. Thus, the vehicle can travel the whole distance without damaging the ground in traveling on a soft ground with bumps and dips.

(3) The rear part of the vehicle body can be supported by a set of the front axle and the rear axle of a pair of tire axles without vertical extension and contraction, and therefore pitching of the vehicle body can be effectively suppressed.

A fourth constitution of the suspension apparatus of a multi-axle vehicle according to the present invention includes: in a suspension apparatus of a multi-axle vehicle having at least four tire axles; i) front links of which upper end portions are connected to a vehicle body with pins, and of which lower end portions are in vicinities of respective front axles, ii) rear links of which upper end portions are connected to the vehicle body with pins, and of which lower end portions are in vicinities of respective rear axles, and iii) connecting links for longitudinally connecting portions in vicinities of the respective lower end portions of the front links and the rear links, which are placed in vicinities of the respective front axles and the respective rear axles of at least two pairs of the axles including a pair at a forefront and a pair at a rear end, with a first and a second axels from a front of the vehicle being made the pair at the forefront, and a second and a first axles from a rear of the vehicle being made the pair at the rear end; and quadric link structures formed by the vehicle body, the respective front links, the respective rear links and the respective connecting links; and the respective front axles are mounted to vicinities of front joints at lower sides of the respective quadric link structures and the respective rear axles are mounted to vicinities of rear joints at the lower sides of the respective quadric link structures; and in the respective quadric link structures, respective side lengths at sides of the connecting links are shorter than respective side lengths at a side of the vehicle body. Further, in the suspension apparatus: a number of the tire axles is at least six; and at least one pair with an optional adjacent front axle and rear axle being paired may be formed in a middle portion of the pair at the forefront and the pair at the rear end.

In the above fourth constitution, the following operations and effects can be obtained in addition to the operations and the effects in the above-described first constitution. The explanation will be made with the vehicle, in which the first and the second tire axles from the front are made the pair at the forefront, and the third and the fourth tire axles are made the pair at the rear end, being cited as an example.

(1) Since the front part of the vehicle body is supported by a set of the front axle and the rear axle at the forefront without vertical extension and contraction, and the rear part of the vehicle body is supported by a set of the front axle and the rear axle at the rear end without vertical extension and contraction, pitching of the vehicle body can be effectively suppressed.

(2) Since the axle load is always distributed evenly to the four tire axles and the axle load does not concentrate on a specific axle irrespective of the shape of the ground, the vehicle can travel the whole distance without damaging the ground in traveling on a soft ground with bumps and dips.

(3) When the vehicle gets over a step, if the front axle of the front pair of tire axles is pressed against the step, the attitude of the quadric link structure is displaced, and the front axle moves upward and the rear axle moves downward. Consequently, the front axle can ride on the step from a higher position with the rear axle as the support point, and therefore it becomes possible for the vehicle to get over the step with the height exceeding ½ of the tired wheel diameter.

In the suspension apparatus: at least one of the connecting links may be adjustable in length. According to this constitution, the following operations and effects can be obtained. The explanation will be made with the vehicle, in which the first and the second tire axles from the front being made the pair at the forefront, and the third and the fourth tire axles being made the pair at the rear end, being cited as an example.

(1) Since the vehicle height and the road clearance can be adjusted by adjusting the length of the connecting link, stack can be prevented by increasing the vehicle height on an uneven ground, and stable traveling can be obtained by reducing the vehicle height on a level ground.

(2) For example, if the connecting link is adjusted to be long in the pair of the tire axles at the forefront and the connecting link is adjusted to be short in the pair of the tire axles at the rear end, it is possible to tilt the vehicle body to be lower at the rear, and an loading operation to the vehicle is facilitated.

In the suspension apparatus: at least one of the connecting links may comprise a suspension link extending and contracting in length corresponding to a load. According to this constitution, the following operations and effects can be obtained.

(1) When the front axle or the rear axle encounters small bumps and dips on the ground, the front axle or the rear axle swing up and down by the front link or the rear link as a result that the connecting link contracts and extends, and therefore the vehicle responds to the small bumps and dips without displacing the attitude of the entire quadric link structure. As a result of this, good responsiveness to small bumps and dips on the ground is obtained, and riding quality during traveling on a level ground at a high speed is improved.

(2) The vehicle can respond to large bumps and dips on a ground by displacing the attitude of the entire quadric link structure.

In the suspension apparatus: a hydraulic cylinder or a suspension cylinder for controlling an attitude of the quadric link structure may be placed in at least one spot between the vehicle body and the front link and between the vehicle body and the rear link. According to this constitution, the following operations and effects can be obtained. The explanation will be made with the vehicle, in which the first and the second tire axles from the front being made the pair at the forefront, and the third and the fourth tire axles are made the pair at the rear end, being cited as an example.

(1) When the attitude of the quadric link structure at the forefront is controlled to displace the front axle upward and the rear axle downward, and the attitude of the quadric link structure at the rear end is controlled to displace the front axle downward and the rear axle upward, the vehicle contacts the ground with only the second and the third tire axles from the front, and therefore the wheel base and the tread become substantially equal to each other. As a result, the tired wheels at the left side and the right side are individually driven or driven in the reverse directions, respectively, whereby the vehicle can perform pivotal brake turn or ultra-pivotal brake turn.

(2) It is possible for the vehicle to contact the ground with only the first and the fourth tire axles from the front by the reverse operation of the above-described (1), and stability in the longitudinal direction of the vehicle can be maximized as necessary.

(3) It the suspension link is applied to the connection link in the state of the above-described (2), two-axle traveling is possible. This makes it possible to travel with less driving loss on a level ground.

In the suspension apparatus: a suspension cylinder which is placed in at least one spot between the vehicle body and the front link, and controls rotation of the front link; and a suspension cylinder which is placed in at least one spot between the vehicle body and the rear link, and controls rotation of the rear link are included; and a locked or controlled state, and a freely opened state may be selectable for length of the connecting link. According to this constitution, the following operations and effects can be obtained.

(1) The front axle and the rear axle have independent suspensions respectively by bringing the length of the connecting link, which is the lower side of the quadric link structure, into a freely opened state (hereinafter, called a free state), and good riding quality can be obtained in traveling at a high speed.

(2) The movement of the front axle and the rear axle is controlled by the quadric link structure by bringing the length of the connecting link into the locked or controlled state. This enables suppression of the pitching in traveling on an uneven ground, and the performance of getting over a large step can be kept.

(3) If each of the suspension cylinders is brought into the state in which it does not generate a force, in the above-described (2), the axle loads on the front axle and the rear axle are always equal irrespective of the shape of the ground, and therefore the best possible performance of traveling the whole distance on the soft ground can be kept.

In the suspension apparatus: a crawler belt or a chain, which is mounted by being wound around respective tired wheels of at least one pair of the front axle and the rear axle which are paired, may be included. According to this constitution, it is possible to further reduce the pressure of ground contact. It is possible to obtain optimal traction corresponding to the situation of the ground surfaces of a soft ground, grassland and the like by selecting the shape of the chain or the protuberances on the outer circumference surface of the crawler belt, and thus the performance of traveling the whole distance on a soft ground can be more enhanced.

BRIEF DESCRIPTION OF THE DRAWINGS

FIG. 1 is a side view of a tire type carrier vehicle to which a first embodiment of the present invention is applied;

FIG. 2A shows a first example, FIG. 2B shows a second example, and FIG. 2C shows a third example;

FIG. 3A shows traveling on a level ground, and FIG. 3B shows traveling on an uneven ground;

FIG. 4A shows a start of getting over the step, and FIG. 4B shows a state of getting over the step;

FIG. 5A shows a state in which an axle at a forefront is lifted up by α, FIG. 5B shows formation of a track by the axle at the forefront, FIG. 5C shows a smooth advance of a second axle, and FIG. 5D shows traveling in formation of a shallow track;

FIG. 6A is a view for explaining a first example in a three-axle vehicle, FIG. 6B is a view for explaining a second example in the three-axle vehicle, FIG. 6C is a view for explaining an example in a five-axle vehicle, and FIG. 6D is a view for explaining an example in a six-axle vehicle, FIG. 7A is a view for explaining traveling on a level ground, FIG. 7B is a view for explaining traveling on a soft ground, and FIG. 7C is a view for explaining traveling on an uneven ground;

FIG. 11A is a view for explaining a first operation, and FIG. 11B is a view for explaining a second operation;

FIG. 16A is a view for explaining stability at the time of start and stop, and FIG. 16B is a view for explaining stability against pitching;

FIG. 18A shows the time of starting to get over the step, FIG. 18B shows track formation by a wheel at a forefront, FIG. 18C shows deep track formation by a second wheel, and FIG. 18D shows deeper track formation by a third wheel.

BEST MODE FOR CARRYING OUT THE INVENTION

Preferred embodiments according to a suspension apparatus of a multi-axle vehicle of the present invention will be described in detail below with reference to FIG. 1 to FIG. 14, with a tire type carrier vehicle as an example.

Figure 2A:
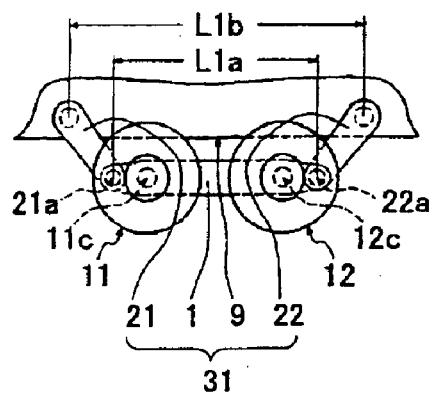
FIG. 2A to FIG. 2C are views for explaining application examples according to the first embodiment.
Figure 2B:
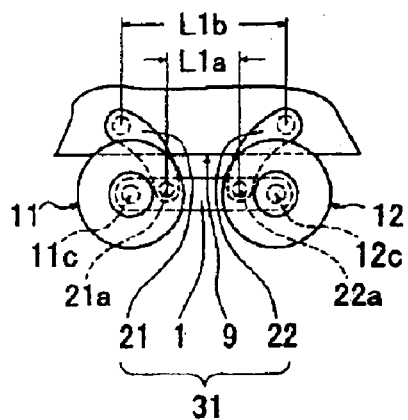
Figure 2C:
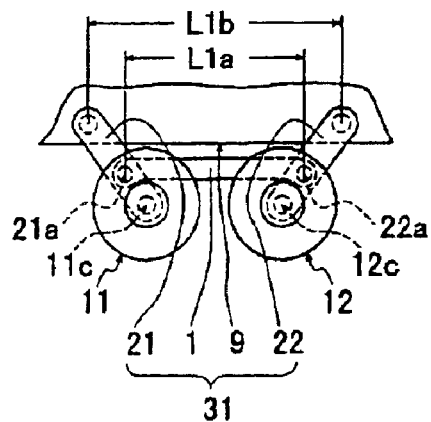

Based on FIG. 1 to FIG. 2C, a first embodiment will be explained. In FIG. 1, in a carrier vehicle 10, four of tire axles 11, 12, 13 and 14 are placed in a vehicle body 9 constituted of a frame 9a, a rear deck 9b, a driver's cab 9c and the like. A first and a second axles 11 and 12 from a front of the vehicle are made a pair at a forefront, and a second and a first axles 13 and 14 from a rear of the vehicle are made a pair at a rear end. In vicinities of the front axles 11 and 13 and the rear axles 12 and 14, front links 21 and 23 are placed with upper end portions being connected to the vehicle body with pins and lower end portions being in vicinities of the front axles 11 and 13. Rear links 22 and 24 are placed with upper end portions connected to the vehicle body 9 with pins and lower end portions being in vicinities of the rear axles 12 and 14. Connecting links 1 and 2, which connects portions in vicinities of the respective lower end portions of the front links 21 and 23 and the rear links 22 and 24, are placed. The vehicle body 9, the front link 21, the rear link 22 and the connecting link 1 form a quadric link structure 31, and the vehicle body 9, the front link 23, the rear link 24 and the connecting link 2 form a quadric link structure 32. The front axles 11 and 13 are mounted to areas in vicinities of front joints at a lower side of the quadric link structures 31 and 32, and the rear axles 12 and 14 are mounted to areas in vicinities of rear joints at the lower side of the quadric link structures 31 and 32. In the quadric link structures 31 and 32, side lengths L1a and L2a on the sides of the connecting links 1 and 2 are shorter than side lengths L1b and L2b on the sides of the vehicle bodies 9 and 9.

In FIG. 1, the front axels 11 and 13 are concentrically mounted to the front joints at the lower sides of the quadric link structures 31 and 32, and the rear axles 12 and 14 are concentrically mounted to the rear joints at the lower sides of the quadric link structures 31 and 32, but instead of being mounted thereto concentrically, they may be mounted to vicinities of the front joints and the rear joints. The examples will be described in detail based on FIG. 2A to FIG. 2C. In FIG. 2A, in a first example, the front axle 11 and the rear axle 12 are mounted to positions 11c and 12c on the connecting link 1, in a vicinity of a front joint 21a and in a vicinity of a rear joint 22a at a lower side of the quadric link structure 31. In FIG. 2B, in a second example, the front axle 11 and the rear axle 12 are respectively mounted to the position 11c of a front outer extension portion of the connecting link 1 and the position 12c of a rear outer extension portion, in the vicinity of the front joint 21a and in the vicinity of the rear joint 22a at the lower side of the quadric link structure 31. In FIG. 2C, in a third example, the front axle 11 and the rear axle 12 are respectively mounted to the position 11c of a lower outer extension portion of the front link and the position 12c of a lower outer extension portion of the rear link, in the vicinity of the front joint 21a and in the vicinity of the rear joint 22a at the lower side of the quadric link structure 31.

Though the examples of mounting positions are described with a pair of tire axles 11 and 12 at the forefront being cited as an example, the other pairs of tire axles 13 and 14, and 11X and 12X are mountable to the quadric link structures 31 and 31X respectively as in the above, but this is easy, and therefore the explanation will be omitted.

Figure 3A:
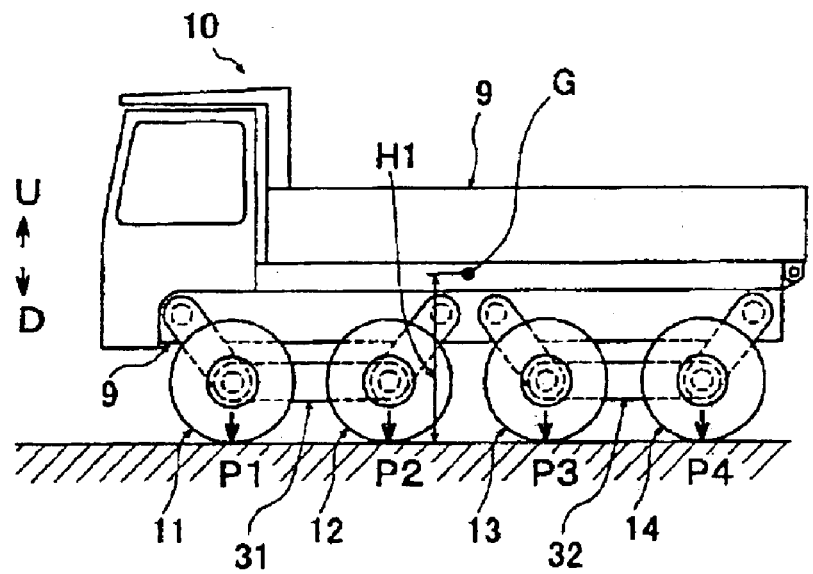
FIG. 3A and FIG. 3B are views for explaining traveling stability of the carrier vehicle in FIG. 1.
Figure 3B:
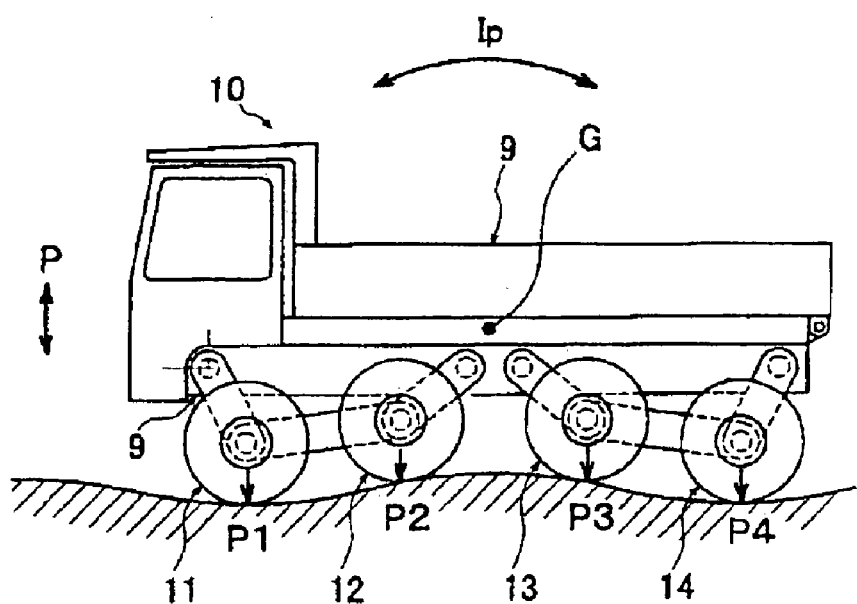

Operations and effects obtained in the above-described constitutions according to FIG. 1 to FIG. 2C will be explained in succession with reference to FIG. 3A to FIG. 5D. With reference to FIG. 3A and FIG. 3B, operations and effects related to traveling stability will be explained. In FIG. 3A, an attitude of the quadric link structure 31 mounted with the tire axles 11 and 12 at the forefront is determined by relationship of the vehicle body 9 and the ground, and it converges on an attitude in which the axel loads on the front axle and the rear axle 12 become equal to each other. The same can be said of the quadric link structure 32 mounted with the rearmost tire axles 13 and 14 at the rear end. As a result, when the tire axles 11 and 12 at the forefront and the tire axles 13 and 14 at the rear end are placed to be longitudinally symmetrical with a center position of the mass G of the vehicle body 9 between them, the axle loads P1, P2, P3 and P4 of the axles 11, 12, 13 and 14 are always equal to each other irrespective of the shape of the ground, and the axel load does not concentrate on a specific tire axle.

In FIG. 3A, a set of the front axel 11 and the rear axle 12 of the paired tire axles at the forefront support the front part of the vehicle body 9 without vertical extension and contraction, and a set of the front axel 13 and the rear axle 14 of the paired tire axles at the rear end support the rear part of the vehicle body 9 without vertical extension and contraction. As a result, so-called squat which is the front part of the vehicle body 9 being lifted up in the direction of the arrow U at the time of the start of the vehicle 10, and so-called nose down which is the front part of the vehicle body 9 sinking in the direction of the arrow D at the time of the stop of the vehicle 10 both become extremely small. For the same reason, this constitution has a suppressing effect on the lateral swing (hereinafter, called rolling) of the vehicle body 9.

In FIG. 3B, since the vehicle body 9, which is long in a longitudinal direction, has large inertia moment Ip in a vertical surface in the longitudinal direction, it cannot sufficiently follow the movement of each of the tire axles 11, 12, 13 and 14 when the carrier vehicle 10 travels on an uneven ground, and thus the swing shown by the arrow P, so-called pitching tends to occur. On the other hand, as for the tire axles 11, 12, 13 and 14, the axles 12 and 13 are not propped up in the middle portions even on the raised ground, and the pair of the axles 11 and 12 at the forefront and the pair of the axles 13 and 14 at the rear end support the front part and the rear part of the vehicle body 9 without vertical extension and contraction. As a result of these, pitching can be effectively suppressed.

Figure 4A:
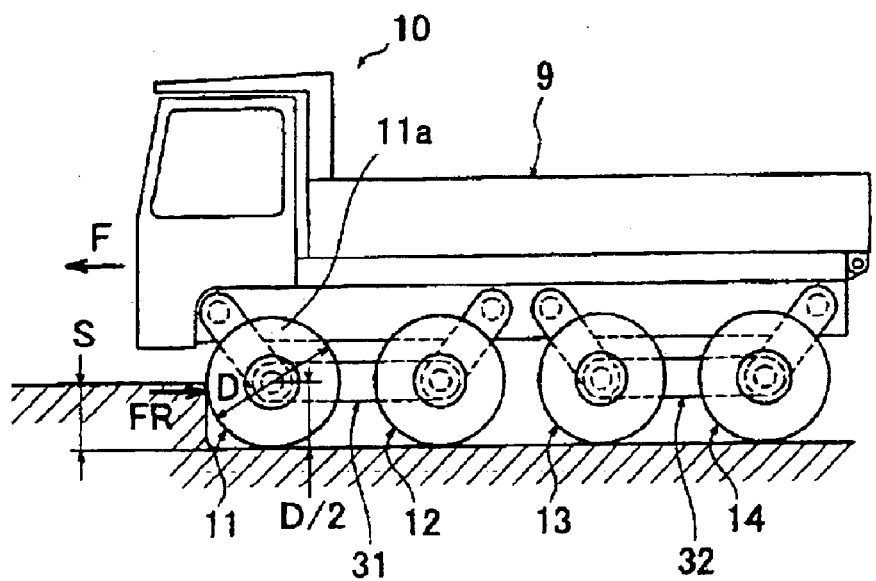
FIG. 4A and FIG. 4B are views for explaining a performance of getting over a step of the carrier vehicle in FIG. 1.
Figure 4B:
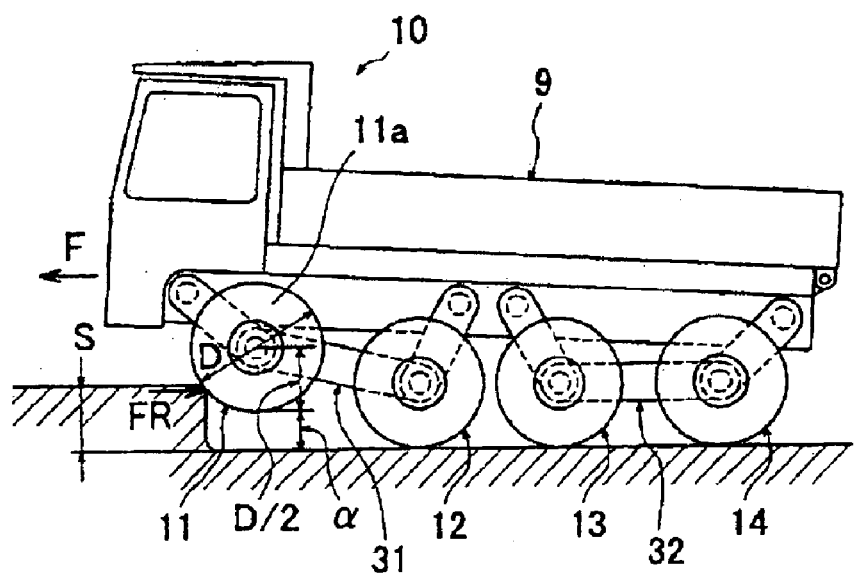

Based on FIG. 4A and FIG. 4B, an operation and an effect related to the performance of getting over a step will be explained. In FIG. 4A, when step height S is equal to ½ of a diameter D of the tired wheel 11a, if the vehicle 10 travels toward the step in a direction of the arrow F, a force shown by the arrow FR is applied to the tire axle 11, and the attitude of the quadric link structure 31 is displaced. As a result, in FIG. 4B, the tire axle 11 can ride on the step from a position higher by α with the tire axle 12 as a support point. Due to this, the vehicle 10 can be obtain the performance of getting over a higher step, which is equivalent to the vehicle having a tired wheel with the diameter of "D+2α".

Figure 5A:
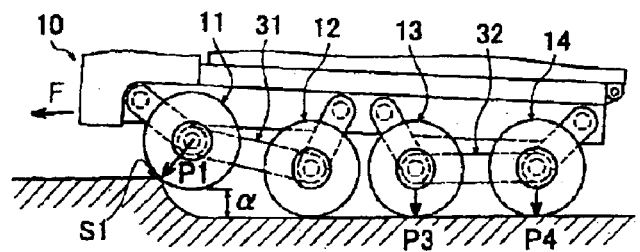
FIG. 5A to FIG. 5D are views for explaining a state in which the carrier vehicle in FIG. 1 travels the whole distance on a soft ground.
Figure 5B:
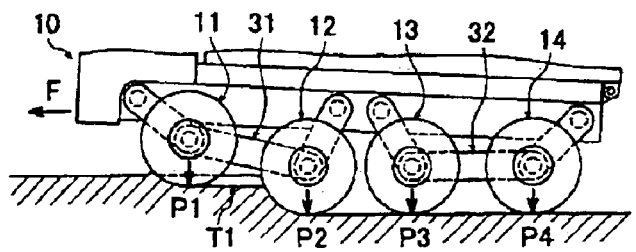

Next, with reference to FIG. 5A to FIG. 5D, an operation and an effect related to the performance of traveling the whole distance on a soft ground will be explained. In FIG. 5A, when the vehicle 10 travels toward a step on a soft ground in the direction of the arrow F, the attitude of the quadric link structure 31 is displaced by a tip end S1 of the step, and the tire axle 11 is lifted upward by α. On this occasion, when the tire axle 11 cannot step over the tip end S1 of the step by the lifting height α, the tire axle 12 is lifted up and the axle load concentrates on the tire axle 11 as shown by the arrow P1. As a result, in FIG. 5B, a track T1 occurs due to the tire axle 11, but when the tire axle 12 contacts the ground, the axle load of each of the tire axles 11, 12, 13 and 14 becomes equal to each other.

Figure 5C:
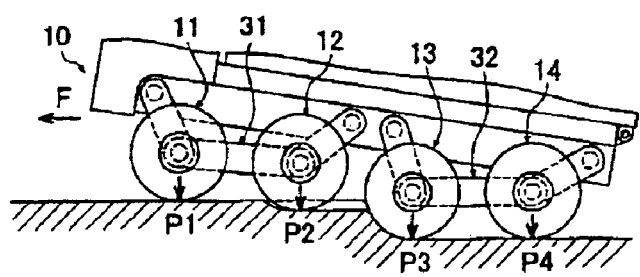
Figure 5D:
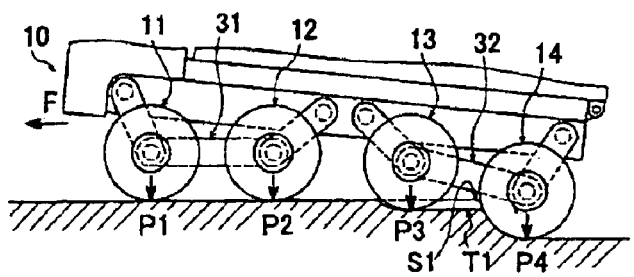

In FIG. 5C, the depth of the track T1 does not increase, and the vehicle 10 can smoothly travel forward. Then, in FIG. 5D, since the track T1 has shallow depth, the step tip end S1 in the intermediate portion of the left and right tracks T1 does not contact the center portion of the axle 14, and the stack state hardly occurs. As a result of the above, the vehicle 10 can obtain high performance in traveling the whole distance on a soft ground.

Figure 6A:
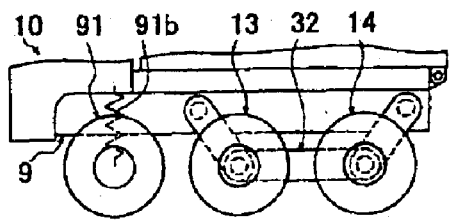
FIG. 6A to FIG. 6D are views for explaining a second embodiment of the present invention.
Figure 6B:
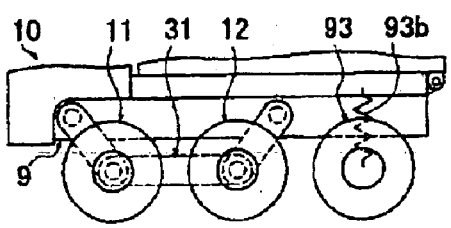

Based on FIG. 6A to FIG. 6D, multi-axle vehicles with, for example, three tire axles and five or more tire axles other than four tire axles will be described as a second embodiment. In FIG. 6A, the vehicle 10 has three tire axles 91, 13 and 14. The second and the first tire axles 13 and 14 from the rear are made a pair at the rear end, and they are respectively mounted to respective vicinities of the front joint and the rear joint at the lower side of the quadric link structure 32. In FIG. 6B, the vehicle 10 has three tire axles 11, 12 and 93.

Figure 6C:
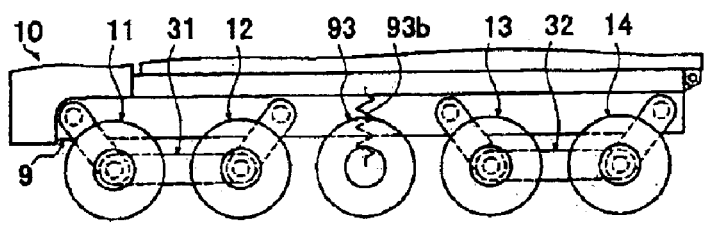

The first and the second tire axles 11 and 12 from the front are made a pair at the forefront, and they are respectively mounted to respective vicinities of the front joint and the rear joint at the lower side of the quadric link structure 31. In FIG. 6C, the vehicle 10 has five tire axles 11, 12, 93, 13 and 14. The first and the second tire axles 11 and 12 from the front are made a pair at the forefront, the second and the first tire axles 13 and 14 from the rear are made a pair at the rear end, and they are respectively mounted to respective vicinities of the front joints and the rear joints at the respective lower sides of the respective quadric link structures 31 and 32.

Figure 6D:
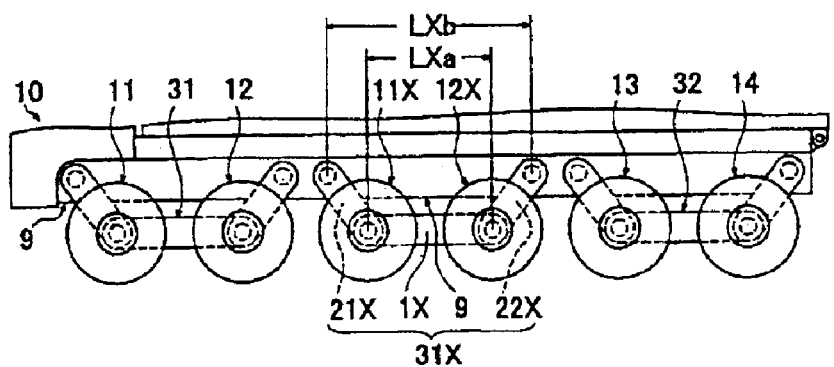

In FIG. 6D, the vehicle 10 has six tire axles 11, 12, 11X, 12X, 13 and 14. The first and the second tire axles 11 and 12 from the front are made a pair at the forefront, the second and the first tire axles 13 and 14 from the rear are made a pair at the rear end, and they are respectively mounted to respective vicinities of the front joints and the rear joints at the respective lower sides of the respective quadric link structures 31 and 32. The tire axles 11X and 12X at the intermediate part are made a pair at the intermediate part, and a front link 21X is placed with an upper end portion connected to the vehicle body 9 with a pin and a lower end portion being in a vicinity of the front axle 11X, in vicinities of the paired front axle 11X and rear axel 12. A rear link 22X is placed with an upper end portion being connected to the vehicle body 9 with a pin and a lower end portion being in a vicinity of the rear axle 12X. A connecting link 1X for longitudinally connecting vicinities of the respective lower end portions of the front link 21X and the rear link 22X is placed.

The vehicle body 9, the front link 21X, the rear link 22X and the connecting link 1X form a quadric link structure 31X. The front axle 11X is mounted to a vicinity of a front joint at a lower side of the quadric link structure 31X, and the rear axle 12X is mounted to a vicinity of the rear joint at the lower side thereof. In the quadric link structure 31X, a side length LXa at a side of the connecting link 1X is shorter than a side length LXb at a side of the vehicle body 9. The detail of the mounting positions of the front axle 11X and the rear axle 12X is the same as the mounting position of the tire axles 11 and 12 in the first embodiment. The above description is one example of carrying out the suspension apparatus of the multi-axle vehicle, but optional adjacent tire axles may be paired without being limited to the above, and any number of pairs not less than one may be adopted.

Figure 7A:
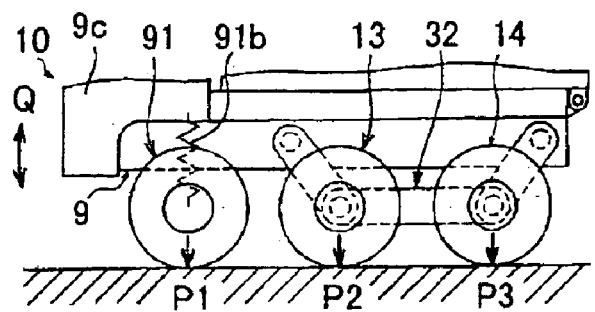
FIG. 7A to FIG. 7C are views for explaining a traveling performance of the three-axle vehicle in FIG. 6A.

An operation and effect obtained in the above-described constitution according to FIG. 6A will be explained with reference to FIG. 7A to FIG. 7C. Operations and effects obtained in the constitutions of FIG. 6B to FIG. 6D are similar to those in FIG. 3A to FIG. 5D in the first embodiment, and the explanation will be omitted. In FIG. 7A, the rear part of the vehicle body 9 is supported by a set of the front axle 13 and the rear axle 14 without vertical extension and contraction, but the attitude of the quadric link structure 32 is free. For this reason, the front part of the vehicle body 9 is free in a vertical direction shown by the arrow Q, and the front part of the vehicle body 9 is supported by the suspension apparatus 91b of the first tire axle 91 from the front to determine the attitude of the vehicle body 9. As a result, ride quality of the driver's cab 9c placed at the front part of the vehicle body 9 can obtain the same softness as the suspension apparatus according to the prior art.

Figure 7B:
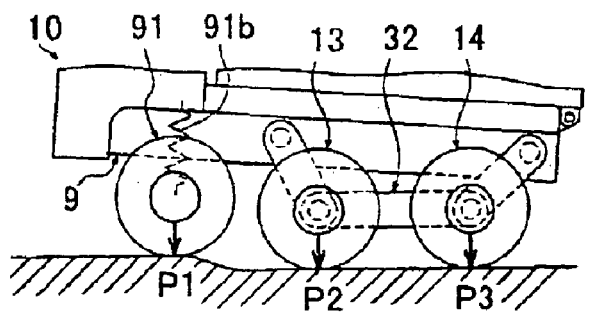
Figure 7C:
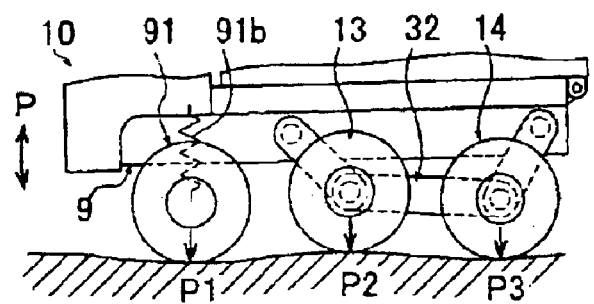

In FIG. 7B, when the vehicle 10 travels on a step on a soft ground, the initially set distribution is always kept for each of the axle loads P1, P2 and P3 of the respective three tire axles irrespective of the shape of the ground for the same reason as described above, and therefore the axle load does not concentrate on a specific axle. As a result, the vehicle can travel the whole distance without damaging the ground in traveling on the soft ground with bumps and dips. In FIG. 7C, when the vehicle 10 travels on an uneven ground, the central tire axle 13 is not propped up even on a raised ground, and the rear part of the vehicle body 9 is supported by a set of the front axle 13 and the rear axle 14 without vertical extension and contraction, thus making it possible to suppress pitching of the vehicle body effectively.

Figure 8:
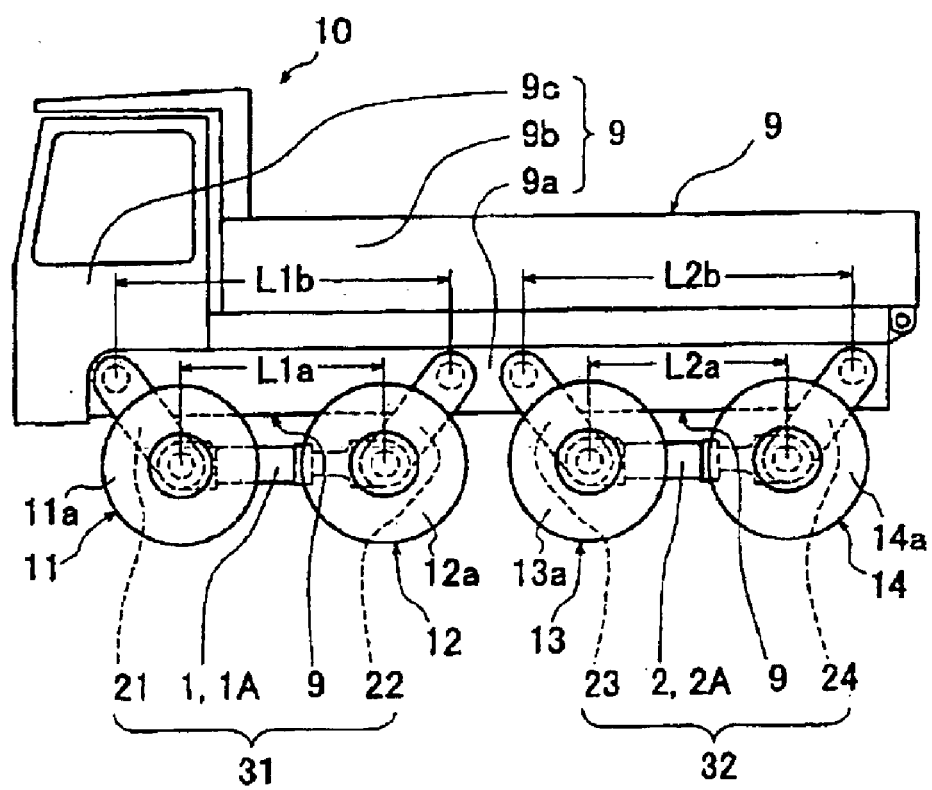
FIG. 8 is a side view of a tire type carrier vehicle to which a third embodiment of the present invention is applied.

Based on FIG. 8, a third embodiment will be explained. In FIG. 8, hydraulic cylinders 1A and 2A are applied respectively to the connecting links 1 and 2 of the respective quadric link structures 31 and 32 at the forefront and the rear end, whereby the lengths of the connecting links 1 and 2 are made adjustable. In this constitution, the following operation and effect can be obtained in addition to the operations and effects in the first embodiment.

(1) By adjusting the lengths of the connecting links 1 and 2 which are lower sides of the quadric link structures 31 and 32, vehicle height and a road clearance (not shown) of the vehicle 10 can be adjusted. As a result, the vehicle height is made higher on an uneven ground to prevent stack, and the vehicle height is made lower on a level ground to make stable traveling possible.

(2) For example, the connecting link 1 is adjusted to be long in a pair of tire axles 11 and 12 at the forefront, and the connecting link 2 is adjusted to be short in a pair of tire axles 13 and 14 at the rear end, whereby it is possible to tilt the vehicle body 9 to be lower at the rear, and an loading and unloading operation to the vehicle 10 can be facilitated.

In this embodiment, the hydraulic cylinders 1 and 2 are used as means for adjusting the lengths of the connecting links 1 and 2, but the means are not limited to the hydraulic cylinders, and the length may be made adjustable with turn buckle type screws (not shown) and the other means. Further, in this embodiment, the explanation is made with the carrier vehicle 10 with the four axles, but this is not restrictive, and the carrier vehicle with three axles or five or more axles may be used. For example, explaining also with use of FIG. 6D, in the case of six axles, the means such as the hydraulic cylinder or the turn buckle type screw (not shown) is applied to the connecting link 1X and the length may be made adjustable.

Figure 9:
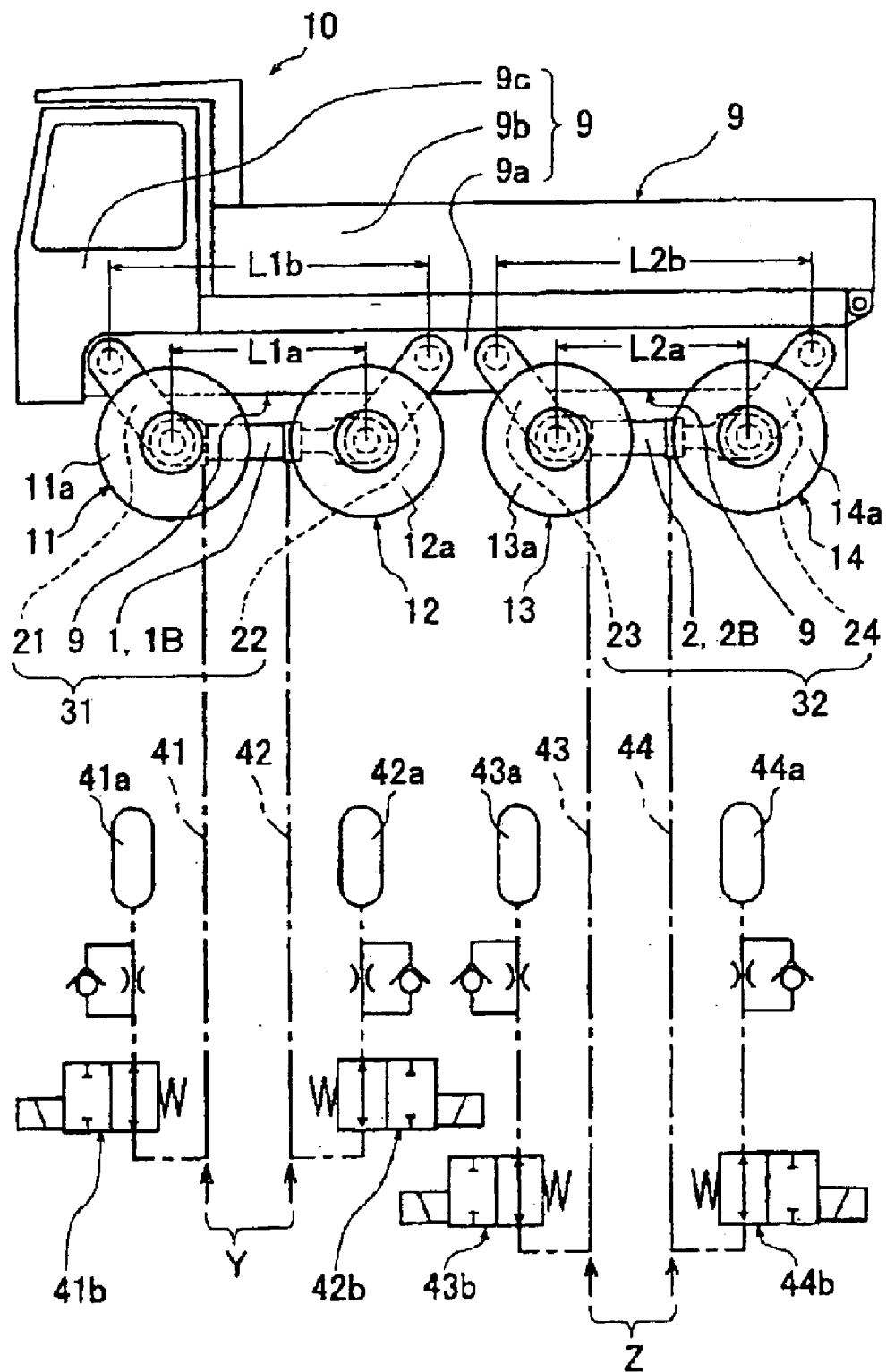
FIG. 9 is a side view of a tire type carrier vehicle to which a fourth embodiment of the present invention is applied.

Based on FIG. 9, a fourth embodiment will be explained. The alternate long and short dash lines in FIG. 9 show hydraulic circuits. In FIG. 9, hydraulic cylinder 1B and 2B are respectively placed at the connection links 1 and 2 of the respective quadric link structures 31 at the forefront and 32 at the rear end. A state of the suspension link extending and contracting according to the load, and a state of the link with fixed length are made selectable for the connecting links 1 and 2 by the hydraulic cylinders 1B and 2B. Hydraulic circuits 41, 42, 43 and 44 including accumulators 41a, 42a, 43a and 44a and on-off valves 41b, 42b, 43b and 44b in the drawing are schematically shown for the purpose of visually showing the above-described function, and the explanation thereof will be omitted as is generally known.

In the above-described constitution, the following operations and effects can be obtained in addition to the operations and effects in the first embodiment.

(1) In the quadric link structures 31 and 32 in which the respective tire axles are mounted as the respective pairs of front axles 11 and 13 and the rear axles 12 and 14, the connecting links 1 and 2 which are the lower sides extend and contract when the front axles 11 and 13 or the rear axles 12 and 14 encounter small bumps and dips on the ground. Due to this, the front axles 11 and 13 or the rear axles 12 and 14 can swing up and down by the respective front links 21 and 23 or the respective rear links 22 and 24. They can respond to the small bumps and dips on the ground without displacing the entire attitudes of the quadric link structures 31 and 32. As a result, favorable responsiveness to the small bumps and dips on the ground is obtained, and ride quality during traveling on a level ground at a high speed is improved.

(2) The vehicle can respond to large bumps and dips on the ground by displacing the entire attitudes of the quadric link structures 31 and 32.

(3) Pitching of the vehicle body 9 can be suppressed by limiting the stroke of a contracting side of each of the connecting links 1 and 2.

(4) By selecting each of the connecting links 1 and 2 to be in the state of the link with the fixed length, the aforementioned performance of getting over the high step can be kept.

(5) If the change-over valves and the hydraulic sources are connected to the positions of the arrows Y and Z in the drawing, the lengths of the hydraulic cylinders 1B and 2B are adjustable, and the same operations and effects as in the third embodiment can be obtained.

In the present embodiment, the hydraulic circuits 41, 42, 43 and 44 including the hydraulic cylinders 1B and 2B and the accumulators 41a, 42a, 43a and 44a are used as the extending and contracting means for the connecting links 1 and 2, but they are not limited to the hydraulic circuits, or they are not limited to the hydraulic cylinders, and the other means such as a suspension apparatus with the combination of a known coil spring and damper may be used. The means such as a suspension apparatus with such a hydraulic circuit and with the combination of a coil spring and a damper may be applied to the connecting link 1X in FIG. 6D.

Figure 10:
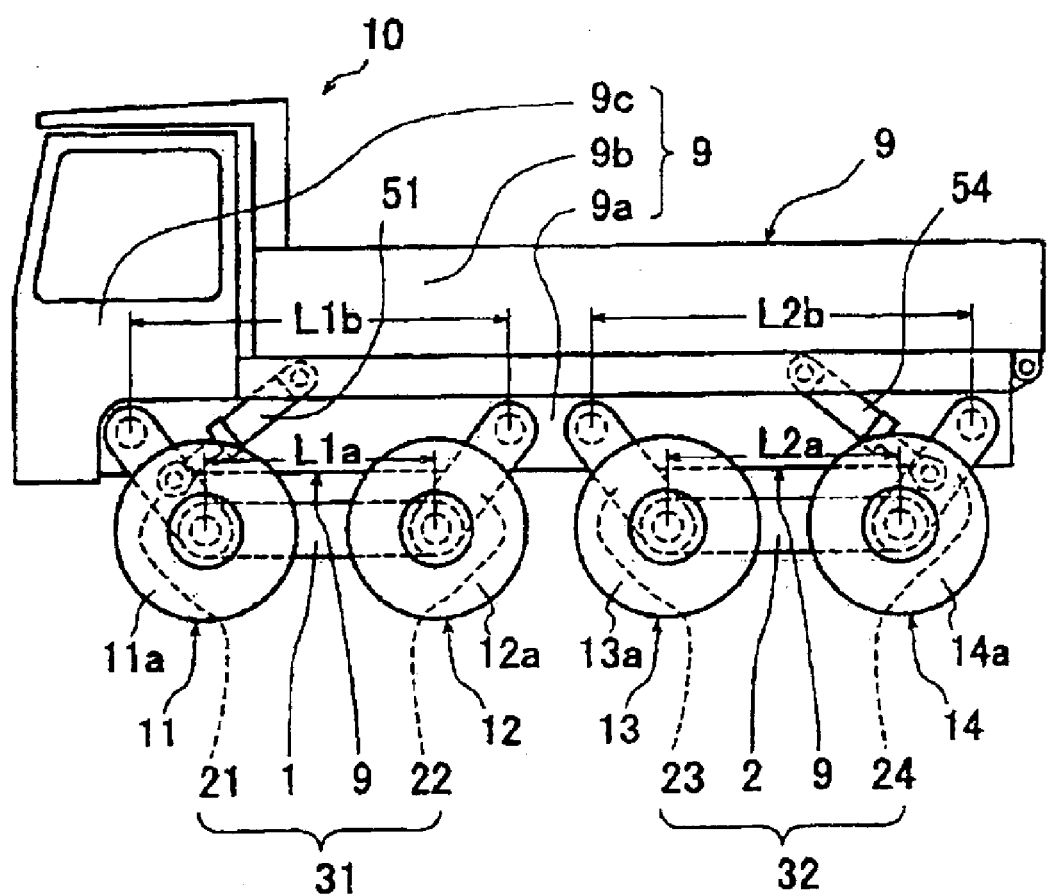
FIG. 10 is a side view of a tire type carrier vehicle to which a fifth embodiment of the present invention is applied.

Based on FIG. 10, a fifth embodiment will be explained. In FIG. 10, hydraulic cylinders 51 and 54 for controlling the attitude of the respective quadric link structures 31 and 32 are placed. In a constitution in FIG. 10, operations and effects further obtained in addition to the operations and effects in the first embodiment will be explained with reference to FIG. 11A and FIG. 11B. Such hydraulic cylinder 51 may be applied to the quadric link structure 31X in FIG. 6D.

Figure 11A:
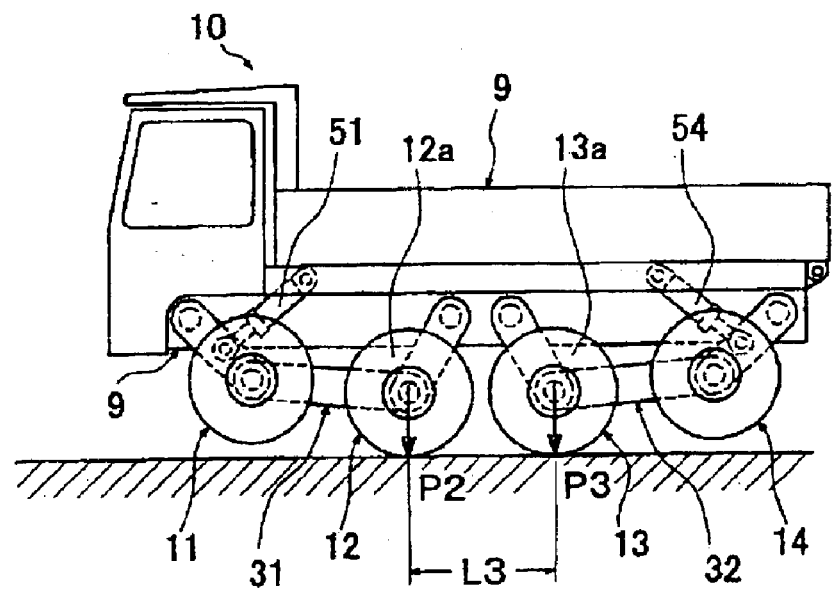
FIG. 11A and FIG. 11B are views for explaining operations of the fifth embodiment.
Figure 11B:
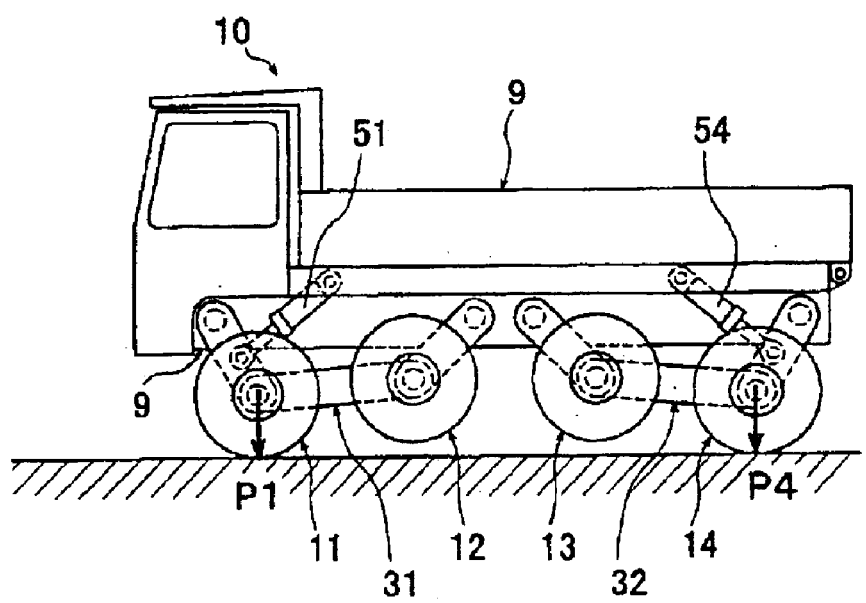

In FIG. 11A, when the hydraulic cylinders 51 and 54 are contracted, the vehicle 10 contacts the ground with only the central tire axles 12 and 13. In this state, a wheel base L3 becomes substantially equal to width (tread) between the left and right tired wheels. Thus, the tired wheels 12a and 13a at the left side and the tired wheels (not shown) at the right side are respectively driven individually, or driven in the reverse directions of each other, whereby the vehicle 10 can perform pivotal brake turn or ultra-pivotal brake turn. In FIG. 11B, when the hydraulic cylinders 51 and 54 are extended, the vehicle 10 contacts the ground with only the tire axles 11 at the forefront and 14 at the rear end. Thereby, the stability in the longitudinal direction of the vehicle can be maximized as necessary.

The hydraulic cylinders 51 and 54 may be placed at any optional positions at which they can control the attitudes of the respective quadric link structures 31 and 32, without being limited to the placement positions in the drawing. When the suspension cylinders 51 and 54, in which spring functions or damping force generating functions, or both the spring functions and the damping force generating functions are given to the hydraulic cylinders 51 and 54, are used, a speed of change in the attitudes of the quadric link structures 31 and 32 can be reduced and riding comfort is increased.

Figure 12:
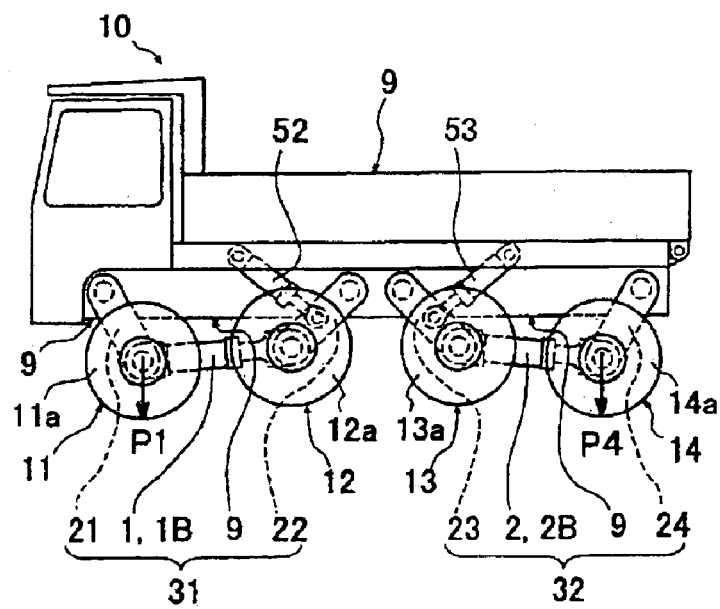
FIG. 12 is a side view of a tire type carrier vehicle to which a sixth embodiment of the present invention is applied.

Based on FIG. 12, a sixth embodiment will be explained. In FIG. 12, the hydraulic cylinders 1B and 2B in the fourth embodiment are applied to the respective connecting links 1 and 2 of the respective quadric link structures 31 and 32, and hydraulic cylinders 52 and 53 for controlling the respective attitudes of the respective quadric link structures 31 and 32 are further placed. The hydraulic cylinders 52 and 53 may be made the suspension cylinders 52 and 53. Such hydraulic cylinders 1B and 52 may be applied to the quadric link structure 31X in FIG. 6D. In a constitution of the sixth embodiment, the following operations and effects can be obtained in addition to the operations and effects in the fifth embodiment.

(1) As shown in FIG. 12, in a state in which the vehicle contacts the ground with the tire axles 11 at the forefront and 14 at the rear end, the suspension link state is selected for the hydraulic cylinders 1B and 2B, whereby two-axle traveling is possible. As a result, traveling with less driving loss is made possible.

(2) In the state of the above-described (1), the state of the link with the fixed length is selected for the hydraulic cylinders 1B and 2B, whereby the stability in the longitudinal direction of the vehicle can be maximized.

Figure 13:
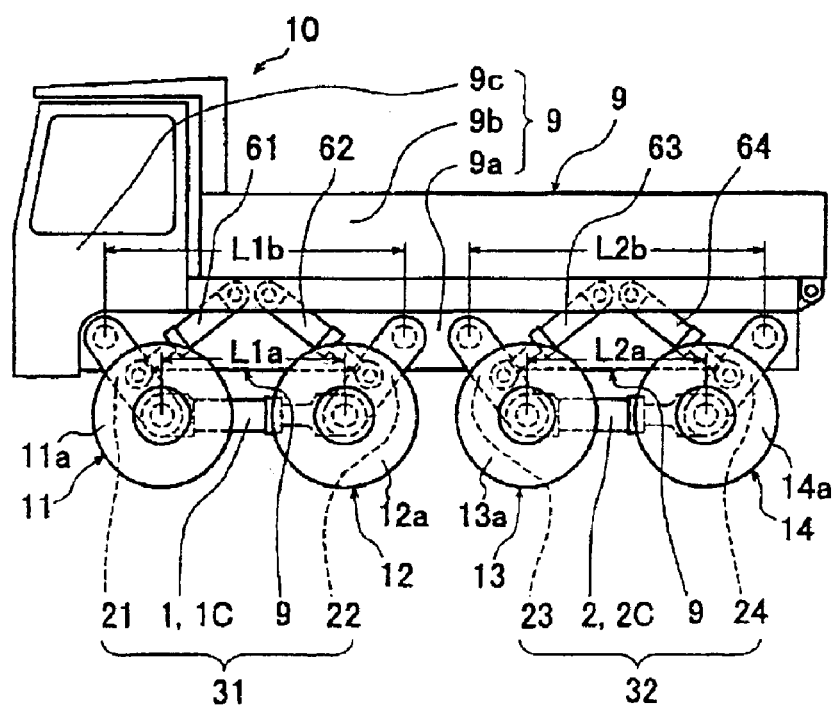
FIG. 13 is a side view of a tire type carrier vehicle to which a seventh embodiment of the present invention is applied.

Based on FIG. 13, a seventh embodiment will be explained. In FIG. 13, hydraulic cylinders 1C and 2C are applied to the respective connecting links 1 and 2 of the respective quadric link structures 31 and 32, and a locked state or a controlled state, and a free state are selectable for the lengths of the connecting links 1 and 2 by the hydraulic cylinders 1C and 2C. At the same time, suspension cylinders 61 and 63, and suspension cylinders 62 and 64 for respectively controlling the respective rotations of the respective front links 21 and 23 and the respective rear links 22 and 24 of the respective quadric link structures 31 and 32 are placed. Each of the suspension cylinders 61, 62, 63 and 64 may be given a length adjusting function and/or a free-state function of causing no force. A constitution of the above-described seventh embodiment may be applied to the quadric link structure 31X in FIG. 6D.

In the constitution of FIG. 13, the following operations and effects can be obtained in addition to the operations and effects in the first, third and fourth embodiments.

(1) The free state is selected for the length of each of the connecting links 1 and 2, whereby each of the front axles 11 and 13 and each of the rear axles 12 and 14 have independent suspensions, and favorable ride quality can be obtained in traveling at a high speed.

(2) The fixed or controlled state is selected for the length of each of the connecting links 1 and 2, whereby the movements of the respective front axles 11 and 13 and the respective rear axles 12 and 14 are dominated respectively by the quadric link structures 31 and 32. This makes it possible to suppress pitching in traveling on an uneven ground, and the performance of getting over a large step can be kept.

(3) If the free state generating no force is made selectable for each of the suspension cylinders 61, 62, 63 and 64, in the state of the above-described (2), the axle loads of each of the front axles 11 and 13 and each of the rear axles 12 and 14 are equal, and therefore the performance of traveling the whole distance on a soft ground can be kept at the maximum.

(4) If the length adjusting function is made selectable for each of the hydraulic cylinders 1C and 2C in the state of the above-described (3), the operations and effects in the third embodiment can be obtained, and if the suspension function is made selectable for them, the operations and effects in the fourth embodiment can be obtained.

(5) If the length adjusting function is made selectable for each of the suspension cylinders 61, 62, 63 and 64 in the state of the above-described (2), the same operations and effects as in the fifth embodiment can be obtained.

(6) If the suspension function is made selectable for each of the hydraulic cylinders 1C and 2C in the state of the above-described (5), the same operations and effects as in the sixth embodiment can be obtained.

In the above description, the hydraulic cylinders 1C and 2C are used as the means for making the length of the connecting links 1 and 2 selectable, but the means is not limited to them, and the other means such as the one for making it extendable and contractible with a rod sliding inside a sleeve, for example, and fixing with a transverse pin (neither one illustrated) may be used. Instead of the suspension cylinders 61, 62, 63 and 64, the other suspension means such as a suspension apparatus combining, for example, a known coil spring and a damper, or a torsion bar may be used.

In the third to the seventh embodiments, the tire type carrier vehicle having four tire axles is described, but this is not restrictive, and the present invention may be carried out with the tire type carrier vehicle having three and five or more tire axles as in the second embodiment (FIG. 6A to FIG. 6D). In this case, the quadric link structure 31X (FIG. 6D) may be constituted similarly to the quadric link structure 31.

Figure 14:
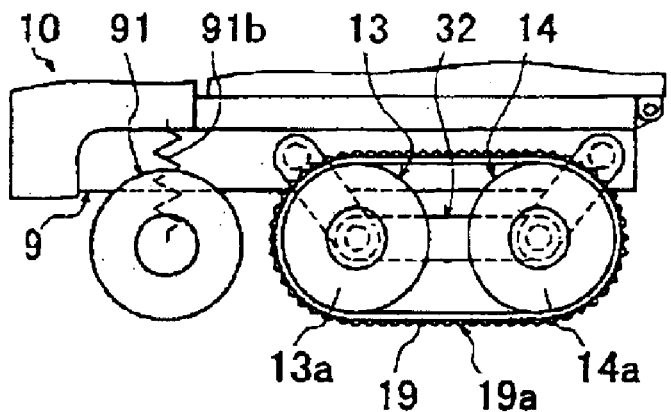
FIG. 14 is a side view of a tire type carrier vehicle to which an eighth embodiment of the present invention is applied.
Figure 15:
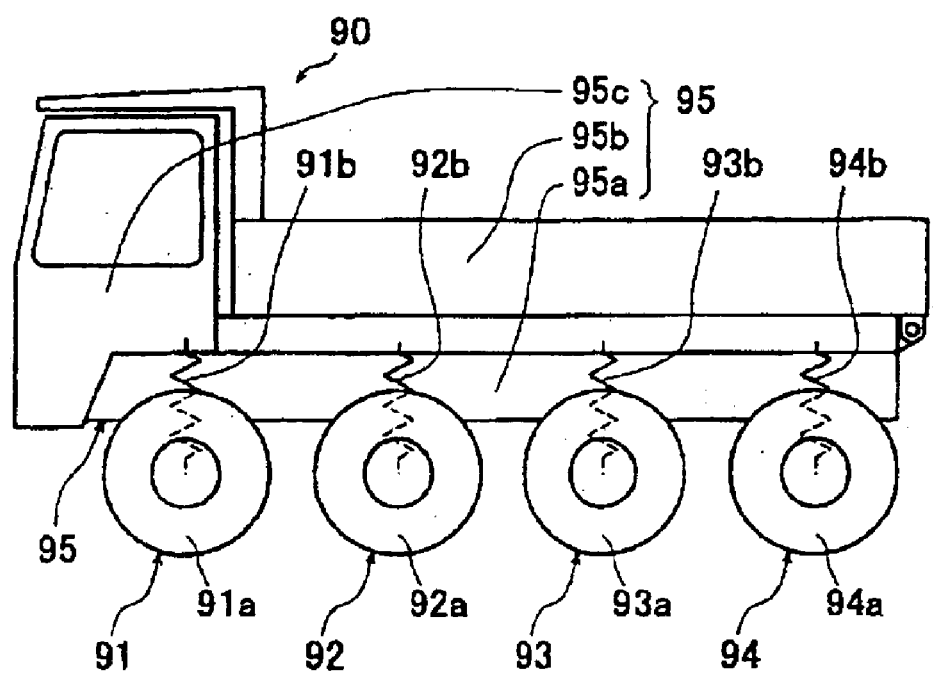
FIG. 15 is a side view of a tire type carrier vehicle to which a suspension apparatus of a multi-axle vehicle according to a prior art is applied.
Figure 16A:
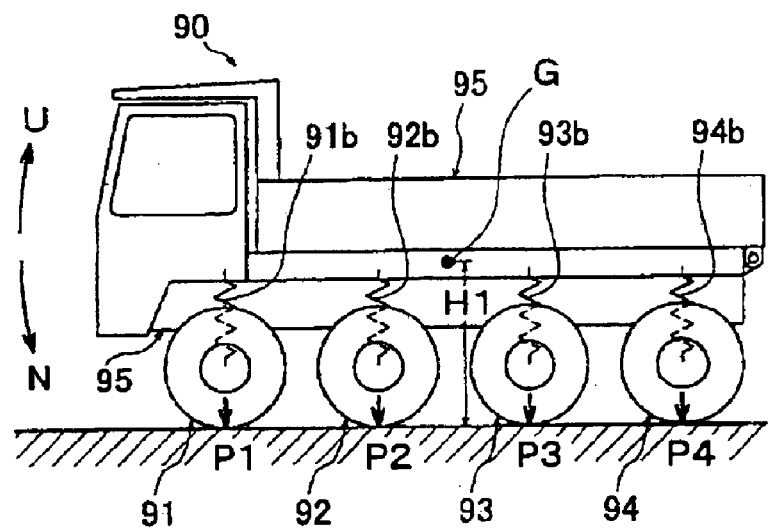
FIG. 16A and FIG. 16B are views for explaining traveling stability of a tire type carrier vehicle to which the suspension apparatus of the multi-axle vehicle according to the prior art is applied.
Figure 16B:
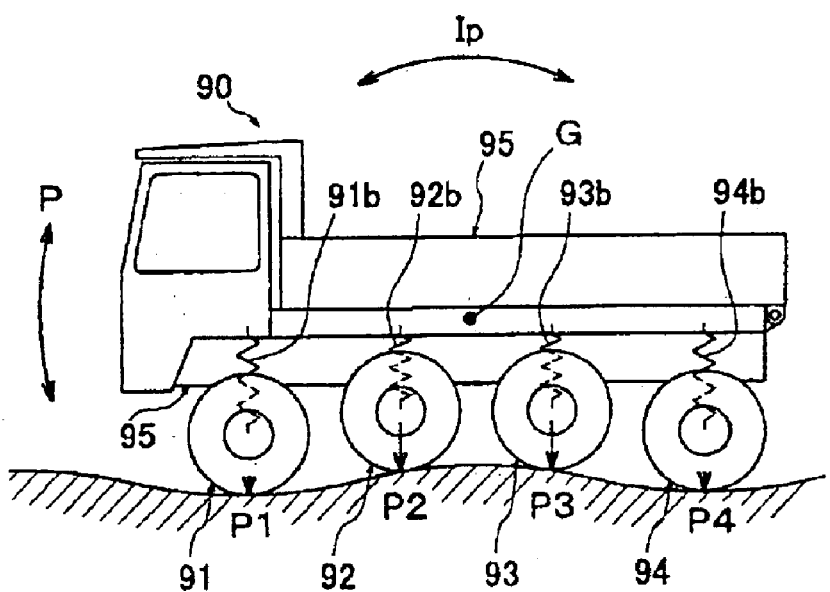
Figure 17:
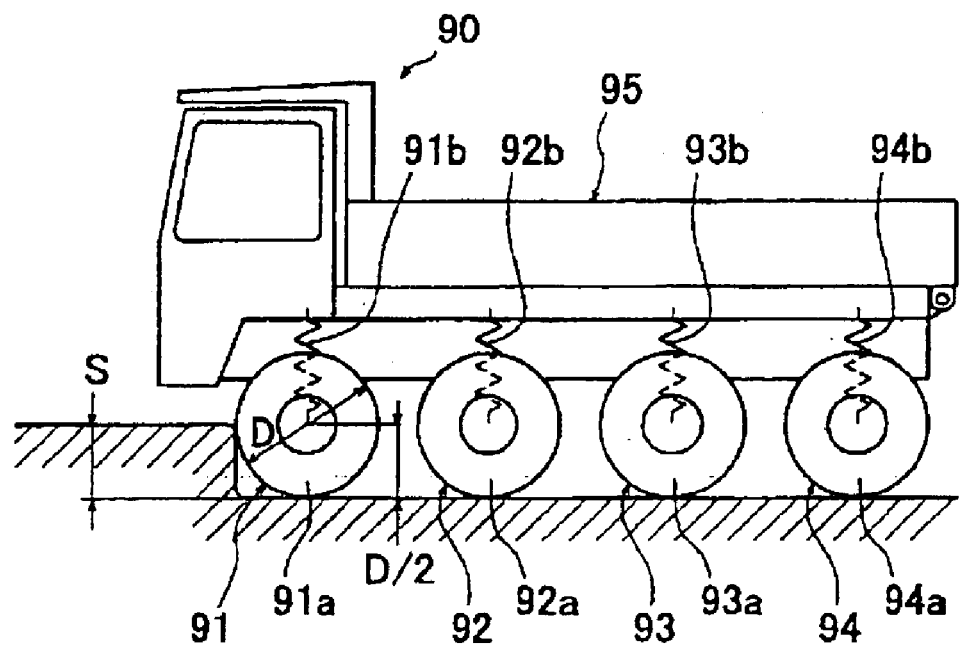
FIG. 17 is a view for explaining a performance of getting over a step of a tire type carrier vehicle to which the suspension apparatus of the multi-axle vehicle according to the prior art is applied.
Figure 18A:
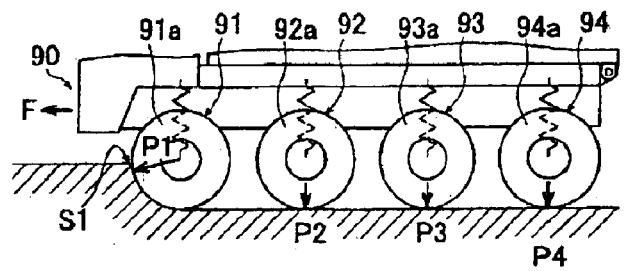
FIG. 18A to FIG. 18D are views for explaining a state in which the tire type carrier vehicle, to which the suspension apparatus of the multi-axle vehicle according to the prior art is applied, gets over a step on a soft ground.
Figure 18B:
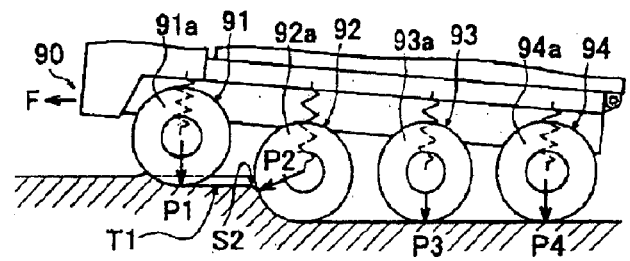
Figure 18C:
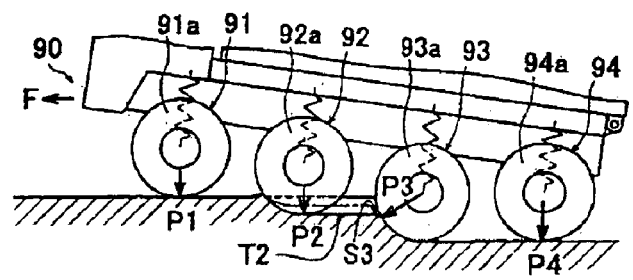
Figure 18D:
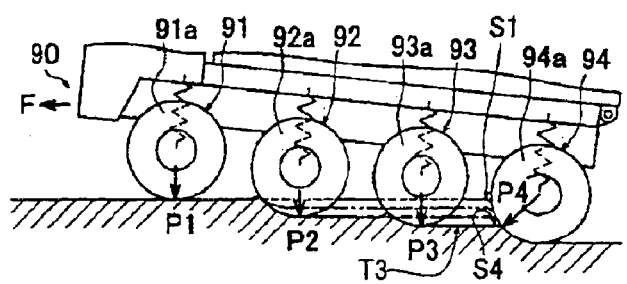

Based on FIG. 14, an eighth embodiment will be explained. In FIG. 14, a crawler belt 19 is attached around the respective tired wheels 13a and 14a of the front axle 13 and the rear axle 14 mounted to the quadric link structure 32 as a pair. In a constitution in FIG. 14, it is possible to further reduce pressure of ground contact of the vehicle 10, and it is further possible to obtain optimal traction corresponding to the situations of the ground surfaces of a soft ground, grassland and the like by selecting the shape of an outer circumference surface protuberance 19a of the crawler belt 19. These can further increase the performance of traveling the whole distance on a soft ground. In the above description, the crawler belt 19 is wound around the only pair of the front axle 13 and the rear axle 14 of the multi-axle vehicle having three tire axles, but this is not restrictive. For example, the crawler belt 19 may be wound around an optional number of pairs of front axles and rear axles in an optional pairs in the multi-axle vehicle having four or more tire axles. A chain 19 may be also wound around them instead of the crawler belt 19.

According to the above, in the suspension apparatus of the multi-axle vehicle having three or more tire axles, the suspension apparatus of the multi-axle vehicle which realizes traveling stability which hardly causes pitching, the performance of getting over a high step and the performance of traveling the whole distance on a soft ground can be provided. In the above explanation, the embodiments of the suspension apparatus of the multi-axle vehicle are explained with the tire type carrier vehicle as the example, but the present invention is not limited to the tire type carrier vehicle. For example, the present invention can be carried out similarly in the suspension apparatuses of the other multi-axle vehicles, and the same operations and effects can be obtained.

What is claimed is:

1. A suspension apparatus of a multi-axle vehicle having at least three tire axles, comprising:
   i) a front link including an upper end portion connected to a vehicle body with a pin, and a lower end portion in a vicinity of a front axle,
   ii) a rear link including an upper end portion connected to said vehicle body with a pin, and a lower end portion in a vicinity of a rear axle adjacent to said front axle, and
   iii) a connecting link for longitudinally connecting portions in vicinities of the respective lower end portions of said front link and said rear link so as to pair said front axle and said rear axle;
   wherein said vehicle body, said front link, said rear link and said connecting link form a quadric link structure, and said suspension apparatus comprises at least one said quadric link structure; and
   wherein a side length of said connecting link is shorter than a side length of said vehicle body.

2. The suspension apparatus of the multi-axle vehicle according to claim 1, wherein said connecting link is adjustable in length.

3. The suspension apparatus of the multi-axle vehicle according to claim 2, wherein one of a hydraulic cylinder and a suspension cylinder for controlling an attitude of said quadric link structure is provided at least one of between said vehicle body and said front link and between said vehicle body and said rear link.

4. The suspension apparatus of the multi-axle vehicle according to claim 1, wherein said connecting link comprises a suspension link which extends and contracts in length in accordance with a load.

5. The suspension apparatus of the multi-axle vehicle according to claim 4, wherein one of a hydraulic cylinder and a suspension cylinder for controlling an attitude of said quadric link structure is provided at least one of between said vehicle body and said front link and between said vehicle body and said rear link.

6. The suspension apparatus of the multi-axle vehicle according to claim 1, wherein one of a hydraulic cylinder and a suspension cylinder for controlling an attitude of said quadric link structure is provided at least one of between said vehicle body and said front link and between said vehicle body and said rear link.

7. The suspension apparatus of the multi-axle vehicle according to claim 1, further comprising:
   a suspension cylinder which is provided between said vehicle body and said front link, and which controls rotation of said front link; and
   a suspension cylinder which is provided between said vehicle body and said rear link, and which controls rotation of said rear link,
   wherein a length of said connecting link is selected to be one of a locked or controlled state, and a freely opened state.

8. The suspension apparatus of the multi-axle vehicle according to claim 1, further comprising one of a crawler belt or a chain which is wound around respective tired wheels of at least one of said pair of said front axle and said rear axle.

9. The suspension apparatus of the multi-axle vehicle according to claim 1, wherein said front axle is mounted to a vicinity of a front joint at a lower side of said quadric link structure and said rear axle is mounted to a vicinity of a rear joint at the lower side of said quadric link structure.

10. The suspension apparatus of the multi-axle vehicle according to claim 9, wherein said connecting link is adjustable in length.

11. The suspension apparatus of the multi-axle vehicle according to claim 10, wherein one of a hydraulic cylinder and a suspension cylinder for controlling an attitude of said quadric link structure is provided at least one of between said vehicle body and said front link and between said vehicle body and said rear link.

12. The suspension apparatus off the multi-axle vehicle according to claim 9, wherein said connecting link comprises a suspension link which extends and contracts in length in accordance with a load.

13. The suspension apparatus of the multi-axle vehicle according to claim 12, wherein one of a hydraulic cylinder and a suspension cylinder for controlling an attitude of said quadric link structure is provided at least one of between said vehicle body and said front link and between said vehicle body and said rear link.

14. The suspension apparatus of the multi-axle vehicle according to claim 9, wherein one of a hydraulic cylinder and a suspension cylinder for controlling an attitude of said quadric link structure is provided at least one of between said vehicle body and said front link and between said vehicle body and said rear link.

15. The suspension apparatus of the multi-axle vehicle according to claim 9, further comprising:
   a suspension cylinder which is provided between said vehicle body and said front link, and which controls rotation of said front link; and
   a suspension cylinder which is provided between said vehicle body and said rear link, and which controls rotation of said rear link,
   wherein a length of said connecting link is selected to be one of a locked or controlled state, and a freely opened state.

16. The suspension apparatus of the multi-axle vehicle according to claim 9, further comprising one of a crawler belt and a chain which is wound around respective tired wheels of at least one said pair of said front axle and said rear axle.

17. A suspension apparatus of a multi-axle vehicle having at least four tire axles, comprising:
   i) a plurality of front links, each of which includes an upper end portion connected to a vehicle body with pins, and a lower end portion in a vicinity of a respective front axle,
   ii) a plurality of rear links, each of which includes an upper end portion connected to said vehicle body with pins, and a lower end portion in a vicinity of a respective rear axle, and
   iii) a plurality of connecting links, each of which longitudinally connects portions in vicinities of the respective lower end portions of a respective one of said front links and a respective one of said rear links so as to pair respective front axles and respective rear axles of at least two pairs of said axles, such that said at least four axles form a pair at a forefront of the vehicle and a pair at a rear end of the vehicle, with a first axle and a second axle from a front of the vehicle forming the pair at the forefront, and a second axle and a first axle from a rear of said vehicle forming the pair at the rear end;
   wherein a plurality of quadric link structures are each formed by said vehicle body, a respective front link, a respective rear link and a respective connecting link, and wherein respective side lengths of said connecting links are shorter then respective side lengths of said vehicle body.

18. The suspension apparatus of the multi-axle vehicle according to claim 17, wherein said at least four tire axles comprise at least six tire axles; and
wherein at least one pair of an adjacent front axle and rear axle is formed in a middle portion of said vehicle between said pair at the forefront and said pair at the rear end.

19. The suspension apparatus of the multi-axle vehicle according to claim 18, wherein at least one of said connecting links is adjustable in length.

20. The suspension apparatus of the multi-axle vehicle according to claim 19, wherein one of a hydraulic cylinder and a suspension cylinder for controlling an attitude of at least one of said quadric link structures is provided at least one of between said vehicle body and a respective one of said front links and between said vehicle body and a respective one of said rear links.

21. The suspension apparatus of the multi-axle vehicle according to claim 18, wherein at least one of said connecting links comprises a suspension link which extends and contracts in length in accordance with a lead.

22. The suspension apparatus of the multi-axle vehicle according to claim 21, wherein one of a hydraulic cylinder and suspension cylinder for controlling an attitude of at least one of said quadric link structures is provided at least one of between said vehicle body and a respective one of said front links and between said vehicle body and a respective one of said rear links.

23. The suspension apparatus of the multi-axle vehicle according to claim 18, wherein one of a hydraulic cylinder and a suspension cylinder for controlling an attitude of at least one of said quadric link structures is provided at least one of between said vehicle body and a respective one of said front links and between said vehicle body and a respective one of said rear links.

24. The suspension apparatus of the multi-axle vehicle according to claim 18, further comprising:
a suspension cylinder which is provided between said vehicle body and a respective one of said front links, and which controls rotation of said respective front links; and
a suspension cylinder which is provided between said vehicle body and a respective one of said rear links, and which controls rotation of said rear link,
wherein a length of said connecting links is selected to be one of a locked or controlled state, and a freely opened state.

25. The suspension apparatus of the multi-axle vehicle according to claim 18, further comprising one of a crawler belt and a chain which is wound around respective tired wheels of at least one said pair of said front axle and said rear axle.

26. The suspension apparatus of the multi-axle vehicle according to claim 17, wherein at least one of said connecting links is adjustable in length.

27. The suspension apparatus of the multi-axle vehicle according to claim 26, wherein one of a hydraulic cylinder and a suspension cylinder for controlling an attitude of at least one of said quadric link structures is provided at least one of between said vehicle body and a respective one of said front links and between said vehicle body and a respective one of said rear links.

28. The suspension apparatus of the multi-axle vehicle according to claim 17, wherein at least one of said connecting links comprises a suspension link which extends and contracts in length in accordance with a load.

29. The suspension apparatus of the multi-axle vehicle according to claim 28, wherein one of a hydraulic cylinder and a suspension cylinder for controlling an attitude of at least one of said quadric link structures is provided at least one of between said vehicle body and a respective one of said front links and end between said vehicle body and a respective one of said rear links.

30. The suspension apparatus of the multi-axle vehicle according to claim 17, wherein one of a hydraulic cylinder and a suspension cylinder for controlling an attitude of at least one of said quadric link structures is provided at least one of between said vehicle body and a respective one of said front links and between said vehicle body and a respective one of said rear links.

31. The suspension apparatus of the multi-axle vehicle according to claim 17, further comprising:
a suspension cylinder which is provided between said vehicle body and a respective one of said front links, and which controls rotation of said respective front links; and
a suspension cylinder which is provided between said vehicle body and a respective one of said rear links, and which controls rotation of said respective rear link,
wherein a length of said connecting links is selected to be one of a locked or controlled state, and a freely opened state.

32. The suspension apparatus of the multi-axle vehicle according to claim 17, further comprising one of a crawler belt and a chain which is wound around respective tired wheels of at least one said pair of said front axle and said rear axle.

33. The suspension apparatus of the multi-axle vehicle according to claim 17, wherein said respective front axles are mounted to vicinities of front joints at lower sides of respective quadric link structures and said respective rear axles are mounted to vicinities of rear joints at the lower sides of said respective quadric link structures.

34. The suspension apparatus of the multi-axle vehicle according to claim 33, wherein said at least four tire axles comprise at least six tire axles; and
wherein at least one pair of an adjacent front axle and rear axle is formed in a middle portion of said vehicle between said pair at the forefront and said pair at the rear end.

35. The suspension apparatus of the multi-axle vehicle according to claim 34, wherein at least one of said connecting links is adjustable in length.

36. The suspension apparatus of the multi-axle vehicle according to claim 35, wherein one of a hydraulic cylinder and a suspension cylinder for controlling an attitude of at least one of said quadric link structures is provided at least one of between said vehicle body and a respective one of said front links and between said vehicle body and a respective one of said rear links.

37. The suspension apparatus of the multi-axle vehicle according to claim 34, wherein at least one of said connecting links comprises a suspension link which extends and contracts in length in accordance with a load.

38. The suspension apparatus of the multi-axle vehicle according to claim 37, wherein one of a hydraulic cylinder and a suspension cylinder for controlling an attitude of at least one of said quadric link structures is provided at least one of between said vehicle body and a respective one of said front links and between said vehicle body and a respective one of said rear links.

39. The suspension apparatus of the multi-axle vehicle according to claim 34, wherein one of a hydraulic cylinder and a suspension cylinder for controlling an attitude of at least one of said quadric link structures is provided at least one of between said vehicle body and a respective one of said front links and between said vehicle body and a respective one of said rear links.

40. The suspension apparatus of the multi-axle vehicle according to claim 34, further comprising:
a suspension cylinder which is provided between said vehicle body and a respective one of said front links, and which controls rotation of said respective front link; and
a suspension cylinder which is provided between said vehicle body and a respective one of said rear links, and which controls rotation of said respective rear link,
wherein a length of said connecting links is selected to be one of a locked or controlled state, and a freely opened state.

41. The suspension apparatus of the multi-axle vehicle according to claim 34, further comprising one of a crawler belt and a chain which is wound around respective tired wheels of at least one said pair of said front axle and said roar axle.

42. The suspension apparatus of the multi-axle vehicle according to claim 33, wherein at least one of said connecting links is adjustable in length.

43. The suspension apparatus of the multi-axle vehicle according to claim 42, wherein one of a hydraulic cylinder and a suspension cylinder for controlling an attitude of at least one of said quadric link structures is provided at least one of between said vehicle body and a respective one of said front links and between said vehicle body and a respective one of said rear links.

44. The suspension apparatus of the multi-axle vehicle according to claim 33, wherein at least one of said connecting links comprises a suspension link which extends and contracts in length in accordance with a load.

45. The suspension apparatus of the multi-axle vehicle according to claim 44, wherein one of a hydraulic cylinder and a suspension cylinder for controlling an attitude of at least one of said quadric link structures is provided at least one of between said vehicle body and a respective one of said front links and between said vehicle body and a respective one of said rear links.

46. The suspension apparatus of the multi-axle vehicle according to claim 33, wherein one of a hydraulic cylinder and a suspension cylinder for controlling an attitude of at least one of said quadric link structures is provided at least one of between said vehicle body and a respective one of said front links and between said vehicle body and a respective one of said rear links.

47. The suspension apparatus of the multi-axle vehicle according to claim 33, further comprising:
a suspension cylinder which is provided between said vehicle body and a respective one of said front links, and which controls rotation of said respective front link; and
a suspension cylinder which is provided between said vehicle body and a respective one of said rear links, and which controls rotation of said respective rear link,
wherein a length of said connecting links is selected to be one of a locked or controlled state, and a freely opened state.

48. The suspension apparatus of the multi-axle vehicle according to claim 33, further comprising one of a crawler belt and a chain which is wound around respective tired wheels of at least one said pair of said front axle and said rear axle.

* * * * *